US011261403B2

(12) United States Patent
Qin et al.

(10) Patent No.: US 11,261,403 B2
(45) Date of Patent: Mar. 1, 2022

(54) STABILIZED COMPOSITIONS COMPRISING LEUCO COMPOUNDS

(71) Applicant: Milliken & Company, Spartanburg, SC (US)

(72) Inventors: Haihu Qin, Greer, SC (US); Wesley A. Freund, Simpsonville, SC (US); Sanjeev K. Dey, Spartanburg, SC (US); Gregory S. Miracle, Liberty Township, OH (US)

(73) Assignee: Milliken & Company, Spartanburg, SC (US)

( * ) Notice: Subject to any disclaimer, the term of this patent is extended or adjusted under 35 U.S.C. 154(b) by 59 days.

(21) Appl. No.: 16/523,650

(22) Filed: Jul. 26, 2019

(65) Prior Publication Data

US 2020/0032167 A1 Jan. 30, 2020

Related U.S. Application Data

(60) Provisional application No. 62/711,462, filed on Jul. 27, 2018.

(51) Int. Cl.
| | | |
|---|---|---|
| *C11D 3/28* | (2006.01) | |
| *C11D 3/30* | (2006.01) | |
| *C11D 3/40* | (2006.01) | |
| *C11D 3/42* | (2006.01) | |
| *B08B 3/04* | (2006.01) | |
| *C11D 3/00* | (2006.01) | |
| *C11D 3/20* | (2006.01) | |
| *C11D 3/32* | (2006.01) | |
| *C11D 1/66* | (2006.01) | |
| *C11D 7/50* | (2006.01) | |

(52) U.S. Cl.
CPC ............. *C11D 3/0084* (2013.01); *C11D 1/66* (2013.01); *C11D 3/2034* (2013.01); *C11D 3/2058* (2013.01); *C11D 3/2079* (2013.01); *C11D 3/28* (2013.01); *C11D 3/30* (2013.01); *C11D 3/32* (2013.01); *C11D 3/40* (2013.01); *C11D 7/5022* (2013.01)

(58) Field of Classification Search
CPC ....... C11D 3/0084; C11D 3/2034; C11D 3/28; C11D 3/30; C11D 3/40; C11D 3/42; B08B 3/04
See application file for complete search history.

(56) References Cited

U.S. PATENT DOCUMENTS

| | | | |
|---|---|---|---|
| 7,544,216 B2 | 6/2009 | Torres et al. | |
| 7,597,723 B2 | 10/2009 | Moore et al. | |
| 7,637,963 B2 | 12/2009 | Moore et al. | |
| 9,206,382 B2 | 12/2015 | Lant et al. | |
| 10,696,928 B2 * | 6/2020 | Miracle | C11D 17/042 |
| 10,696,929 B2 * | 6/2020 | Miracle | C11D 3/0084 |
| 2010/0311882 A1 | 12/2010 | Eibeck et al. | |
| 2015/0322384 A1 | 11/2015 | Butterfield et al. | |
| 2016/0326467 A1 * | 11/2016 | Qin | C11D 3/42 |

FOREIGN PATENT DOCUMENTS

| | | |
|---|---|---|
| GB | 999480 A1 | 7/1965 |
| WO | WO 2018/085310 A1 | 5/2018 |
| WO | WO 2019/075228 A1 | 4/2019 |
| WO | WO 2019/182929 A1 | 9/2019 |

OTHER PUBLICATIONS

PCT/US2019/043709, International Search Report, filed Jul. 26, 2019, 5 pages.
PCT/US2019/043709, Written Opinion of the International Searching Authority, filed Jul. 26, 2019, 9 pages.

* cited by examiner

*Primary Examiner* — Brian P Mruk
(74) *Attorney, Agent, or Firm* — Robert M. Lanning

(57) ABSTRACT

A composition comprising: (a) a leuco composition; and (b) a stabilizing amount of an antioxidant composition. The antioxidant composition comprises at least one sterically hindered phenol and at least one substituted diarylamine, and the mole ratio of the hindered phenol to the substituted diarylamine is greater than 1:1. In another embodiment, a composition comprises (a) a leuco composition and (b) an antioxidant composition; and optionally (c) a solvent composition. The combined mass of the leuco compounds and antioxidants present in the composition is 10% or more of the total mass of the composition, and (b) the molar ratio of antioxidants present in the composition to leuco compounds present in the composition is greater than 1:1.

24 Claims, No Drawings

STABILIZED COMPOSITIONS COMPRISING LEUCO COMPOUNDS

CROSS REFERENCE TO RELATED APPLICATIONS

The instant application claims, priority to Provisional Serial No. 62/711,462 filed on Jul. 27, 2018, the contents of which are hereby incorporated by reference.

TECHNICAL FIELD

This application describes stabilized compositions that contain leuco compounds with reduced conversion on storage and their use in the laundering of textile articles. By co-formulating a mixture of antioxidants with the leuco compounds, the compositions containing the leuco compounds convert less upon storage. Further, when such stabilized compositions are formulated into a laundry care composition, they retain the ability to enhance the apparent or visually perceived whiteness of, or to impart a desired hue to, textile articles washed or otherwise treated with the laundry care composition.

BACKGROUND

As textile substrates age, their color tends to fade or yellow due to exposure to light, air, soil, and natural degradation of the fibers that comprise the substrates. As such, to visually enhance these textile substrates and counteract the fading and yellowing the use of polymeric colorants for coloring consumer products has become well known in the prior art. For example, it is well known to use whitening agents, either optical brighteners or bluing agents, in textile applications. However, optical brighteners, while colorless in the finished product, have no effect indoors where there is little to no UV light, and traditional whitening agents tend to make liquid products undesirably dark if enough dye is employed to obtain a whitening benefit upon deposition onto the textile substrate.

Leuco dyes are also known in the prior art to exhibit a change from a colorless or slightly colored state to a colored state upon exposure to specific chemical or physical triggers. The change in coloration that occurs is typically visually perceptible to the human eye. Many of these compounds have some absorbance in the visible light region (400-750 nm), and thus more or less have some color. In this invention, a dye is considered as a "leuco dye" if it did not render a significant color at its application concentration and conditions, but renders a significant color in its triggered form. The color change upon triggering stems from the change of the molar attenuation coefficient (also known as molar extinction coefficient, molar absorption coefficient, and/or molar absorptivity in some literatures) of the leuco dye molecule in the 400-750 nm range, preferably in the 500-650 nm range, and most preferably in the 530-620 nm range. The increase of the molar attenuation coefficient of a leuco dye before and after the triggering should be bigger than 50%, more preferably bigger than 200%, and most preferably bigger than 500%.

Thus, it is contemplated to be within the scope of the present invention that the leuco colorants described herein may be ideally suited for use as whitening agents. However, while traditional leuco colorants may be effective to the extent that they maintain a colorless form on storage and undergo a triggered change to a colored or much more highly colored state during or after use by the consumer, it is difficult to control the reaction. Specifically, the difficulty comes in balancing the need to suppress the reaction that leads to the colored form before use, and the need to permit the same reaction once the product is used.

Antioxidants may be employed in compositions to help retard the conversion of leuco compounds to their colored or much more highly colored states during storage. Traditional antioxidants, like the hindered phenols, have some efficacy in this regard. At the typical use level (less than or about 1 wt. %), traditional antioxidants are not effective in stabilizing compositions containing more than 2 wt. % leuco compounds. As such, there remains a need to efficiently slow the conversion of leuco compounds during storage in formulations and yet retain the ability to convert the molecule once used.

It has now surprisingly been found that much higher loading of antioxidant minimize the reaction that leads to the colored form before use, but still provides the desired consumer whiteness benefit onto a textile article.

SUMMARY OF THE INVENTION

In one aspect, the present invention provides a composition comprising: (a) a leuco composition; and (b) a stabilizing amount of an antioxidant composition which comprises at least one sterically hindered phenol and at least one substituted diarylamine, wherein the mole ratio of the hindered phenol to the substituted diarylamine is greater than 1:1.

In another aspect, the present invention provides a composition comprising: (a) a leuco composition; and (b) an antioxidant composition, wherein (i) the combined mass of the leuco compounds and antioxidants present in the composition is 10% or more of the total mass of the composition, and (b) the molar ratio of antioxidants present in the composition to leuco compounds present in the composition is greater than 1:1.

In another aspect, the invention provides a laundry care composition comprising: (a) at least one laundry care ingredient and (b) a composition of this invention. The present invention further encompasses methods for treating textile articles with such a laundry care composition.

DETAILED DESCRIPTION

Definitions

As used herein, the term "alkoxy" is intended to include $C_1$-$C_8$ alkoxy and alkoxy derivatives of polyols having repeating units such as butylene oxide, glycidol oxide, ethylene oxide or propylene oxide.

As used herein, the interchangeable terms "alkyleneoxy" and "oxyalkylene," and the interchangeable terms "polyalkyleneoxy" and "polyoxyalkylene," generally refer to molecular structures containing one or more than one, respectively, of the following repeating units: —$C_2H_4O$—, —$C_3H_6O$—, —$C_4H_8O$—, and any combinations thereof. Non-limiting structures corresponding to these groups include —$CH_2CH_2O$—, —$CH_2CH_2CH_2O$—, —$CH_2CH_2CH_2CH_2O$—, —$CH_2CH(CH_3)O$—, and —$CH_2CH(CH_2CH_3)O$—, for example. Furthermore, the polyoxyalkylene constituent may be selected from the group consisting of one or more monomers selected from a $C_{2-20}$ alkyleneoxy group, a glycidyl group, or mixtures thereof.

The terms "ethylene oxide," "propylene oxide" and "butylene oxide" may be shown herein by their typical designation of "EO," "PO" and "BO," respectively.

As used herein, the terms "alkyl" and "alkyl capped" are intended to mean any univalent group formed by removing a hydrogen atom from a substituted or unsubstituted hydrocarbon. Non-limiting examples include hydrocarbyl moieties which are branched or unbranched, substituted or unsubstituted including $C_1$-$C_{18}$ alkyl groups, and in one aspect, $C_1$-$C_6$ alkyl groups.

As used herein, unless otherwise specified, the term "aryl" is intended to include $C_3$-$C_{12}$ aryl groups. The term "aryl" refers to both carbocyclic and heterocyclic aryl groups.

As used herein, the term "alkaryl" refers to any alkyl-substituted aryl substituents and aryl-substituted alkyl substituents. More specifically, the term is intended to refer to $C_{7-16}$ alkyl-substituted aryl substituents and $C_{7-16}$ aryl substituted alkyl substituents which may or may not comprise additional substituents.

As used herein, the term "detergent composition" is a sub-set of laundry care composition and includes laundry care compositions including but not limited to products for laundering fabrics.

Such compositions may be pre-treatment composition for use prior to a washing step or may be rinse added compositions, as well as cleaning auxiliaries, such as bleach additives and "stain-stick" or pre-treat types.

As used herein, the term "laundry care composition" includes, unless otherwise indicated, granular, powder, liquid, gel, paste, unit dose, bar form and/or flake type washing agents and/or fabric treatment compositions, including but not limited to products for laundering fabrics, fabric softening compositions, fabric enhancing compositions, fabric freshening compositions, and other products for the care and maintenance of fabrics, and combinations thereof. Such compositions may be pre-treatment compositions for use prior to a washing step or may be rinse added compositions, as well as cleaning auxiliaries, such as bleach additives and/or "stain-stick" or pre-treat compositions or substrate-laden products such as dryer added sheets.

As used herein, the term "leuco" (as used in reference to, for example, a compound, moiety, radical, dye, monomer, fragment, or polymer) refers to an entity (e.g., organic compound or portion thereof) that, upon exposure to specific chemical or physical triggers, undergoes one or more chemical and/or physical changes that results in a shift from a first color state (e.g., uncolored or substantially colorless) to a second more highly colored state. Suitable chemical or physical triggers include, but are not limited to, oxidation, pH change, temperature change, and changes in electromagnetic radiation (e.g., light) exposure. Suitable chemical or physical changes that occur in the leuco entity include, but are not limited to, oxidation and non-oxidative changes, such as intramolecular cyclization. Thus, in one aspect, a suitable leuco entity can be a reversibly reduced form of a chromophore. In one aspect, the leuco moiety preferably comprises at least a first and a second π-system capable of being converted into a third combined conjugated π-system incorporating said first and second π-systems upon exposure to one or more of the chemical and/or physical triggers described above.

As used herein, the terms "leuco composition" or "leuco colorant composition" refers to a composition comprising at least one leuco compound having independently selected structures as described in further detail herein.

As used herein "average molecular weight" of the leuco colorant is reported as a weight average molecular weight, as determined by its molecular weight distribution: as a consequence of their manufacturing process, the leuco colorants disclosed herein may contain a distribution of repeating units in their polymeric moiety.

As used herein, the terms "maximum extinction coefficient" and "maximum molar extinction coefficient" are intended to describe the molar extinction coefficient at the wavelength of maximum absorption (also referred to herein as the maximum wavelength), in the range of 400 nanometers to 750 nanometers.

As used herein, the term "first color" is used to refer to the color of the laundry care composition before triggering, and is intended to include any color, including colorless and substantially colorless.

As used herein, the term "second color" is used to refer to the color of the laundry care composition after triggering, and is intended to include any color that is distinguishable, either through visual inspection or the use of analytical techniques such as spectrophotometric analysis, from the first color of the laundry care composition.

As used herein, the term "converting agent" refers to any oxidizing agent as known in the art other than molecular oxygen in any of its known forms (singlet and triplet states).

As used herein, the term "triggering agent" refers to a reactant suitable for converting the leuco composition from a colorless or substantially colorless state to a colored state.

As used herein, the term "whitening agent" refers to a dye or a leuco colorant that may form a dye once triggered that when on white cotton provides a hue to the cloth with a relative hue angle of 210 to 345, or even a relative hue angle of 240 to 320, or even a relative hue angle of 250 to 300 (e.g., 250 to 290).

As used herein, "cellulosic substrates" are intended to include any substrate which comprises at least a majority by weight of cellulose. Cellulose may be found in wood, cotton, linen, jute, and hemp. Cellulosic substrates may be in the form of powders, fibers, pulp and articles formed from powders, fibers and pulp. Cellulosic fibers, include, without limitation, cotton, rayon (regenerated cellulose), acetate (cellulose acetate), triacetate (cellulose triacetate), and mixtures thereof. Articles formed from cellulosic fibers include textile articles such as fabrics. Articles formed from pulp include paper.

As used herein, articles such as "a" and "an" when used in a claim, are understood to mean one or more of what is claimed or described.

As used herein, the terms "include/s" and "including" are meant to be non-limiting.

As used herein, the term "solid" includes granular, powder, bar and tablet product forms.

As used herein, the term "fluid" includes liquid, gel, paste and gas product forms.

The test methods disclosed in the Test Methods Section of the present application should be used to determine the respective values of the parameters of Applicants' inventions.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated.

In one aspect, the molar extinction coefficient of said second colored state at the maximum absorbance in the wavelength in the range 200 to 1,000 nm (more preferably 400 to 750 nm) is preferably at least five times, more preferably 10 times, even more preferably 25 times, most preferably at least 50 times the molar extinction coefficient of said first color state at the wavelength of the maximum absorbance of the second colored state. Preferably, the molar extinction coefficient of said second colored state at the maximum absorbance in the wavelength in the range 200 to 1,000 nm (more preferably 400 to 750 nm) is at least five times, preferably 10 times, even more preferably 25 times, most preferably at least 50 times the maximum molar extinction coefficient of said first color state in the corresponding wavelength range. An ordinarily skilled artisan will realize that these ratios may be much higher. For example, the first color state may have a maximum molar extinction coefficient in the wavelength range from 400 to 750 nm of as little as 10 $M^{-1}$ $cm^{-1}$, and the second colored state may have a maximum molar extinction coefficient in the wavelength range from 400 to 750 nm of as much as 80,000 $M^{-1}$ $cm^{-1}$ or more, in which case the ratio of the extinction coefficients would be 8,000:1 or more.

In one aspect, the maximum molar extinction coefficient of said first color state at a wavelength in the range 400 to 750 nm is less than 1000 $M^{-1}$ $cm^{1}$, and the maximum molar extinction coefficient of said second colored state at a wavelength in the range 400 to 750 nm is more than 5,000 $M^{-1}$ $cm^{-1}$, preferably more than 10,000, 25,000, 50,000 or even 100,000 $M^{-1}$ $cm^{-1}$.

A skilled artisan will recognize and appreciate that a polymer comprising more than one leuco moiety may have a significantly higher maximum molar extinction coefficient in the first color state (e.g., due to the additive effect of a multiplicity of leuco moieties or the presence of one or more leuco moieties converted to the second colored state).

In one aspect, the composition contains a hindered phenol antioxidant in an amount from about 0.001 to about 2% by weight. Preferably the hindered phenol antioxidant is present at a concentration in the range 0.01 to 0.50% by weight.

Anti-oxidants are substances as described in Kirk-Othmer (Vol. 3, page 424) and in Ullmann's Encyclopedia (Vol. 3, page 91).

One class of anti-oxidants used in the present invention is alkylated phenols, having the general formula:

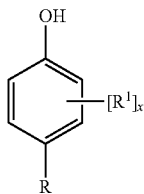

wherein R is $C_1$-$C_{22}$ linear alkyl or $C_3$-$C_{22}$ branched alkyl, each (1) having optionally therein one or more ester (—$CO_2$—) or ether (—O—) links, and (2) optionally substituted by an organic group comprising an alkyleneoxy or polyalkyleneoxy group selected from EO, PO, BO, and mixtures thereof, more preferably from EO alone or from EO/PO mixtures; in one aspect R is preferably methyl or branched $C_3$-$C_6$ alkyl, $C_1$-$C_6$ alkoxy, preferably methoxy; $R^1$ is a $C_3$-$C_6$ branched alkyl, preferably tert-butyl; x is 1 or 2. Some hindered phenolic compounds are a preferred type of alkylated phenols having this formula. A preferred hindered phenolic compound of this type is 3,5-di-tert-butyl-4-hydroxytoluene (BHT). Where any R group in the structure above comprises three or more contiguous monomers, that antioxidant is defined herein as a "polymeric hindered phenol antioxidant".

As used herein, the term "hindered phenol" is used to refer to a compound comprising a phenol group with either (a) at least one $C_3$ or higher branched alkyl, preferably a $C_3$-$C_6$ branched alkyl, preferably tert-butyl, attached at a position ortho to at least one phenolic —OH group, or (b) substituents independently selected from the group consisting of a $C_1$-$C_6$ alkoxy, preferably methoxy, a $C_1$-$C_{22}$ linear alkyl or $C_3$-$C_{22}$ branched alkyl, preferably methyl or branched $C_3$-$C_6$ alkyl, or mixtures thereof, at each position ortho to at least one phenolic —OH group. If a phenyl ring comprises more than one —OH group, the compound is a hindered phenol provided at least one such —OH group is substituted as described immediately above.

A further class of hindered phenol antioxidants suitable for use in the composition is a benzofuran or benzopyran derivative having the formula:

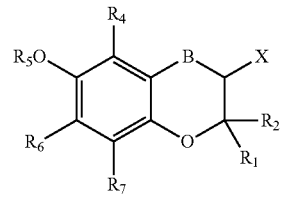

wherein $R_1$ and $R_2$ are each independently alkyl or $R_1$ and $R_2$ can be taken together to form a $C_5$-$C_6$ cyclic hydrocarbyl moiety; B is absent or $CH_2$; $R_4$ is $C_1$-$C_6$ alkyl; $R_5$ is hydrogen or —C(O)$R_3$ wherein $R_3$ is hydrogen or $C_1$-$C_{19}$ alkyl; $R_6$ is $C_1$-$C_6$ alkyl; $R_7$ is hydrogen or $C_1$-$C_6$ alkyl; X is —$CH_2OH$, or —$CH_2A$ wherein A is a nitrogen comprising unit, phenyl, or substituted phenyl. Preferred nitrogen comprising A units include amino, pyrrolidino, piperidino, morpholino, piperazino, and mixtures thereof.

Suitable hindered phenols for use herein include, but are not limited to, 3,3'-bis(1,1-dimethylethyl)-5,5'-dimethoxy-[1,1'-Biphenyl]-2,2'-diol; 3-(1,1-dimethylethyl)-4-hydroxybenzenepropanoic acid; 3-(1,1-dimethylethyl)-1,2-benzenediol; 2-(1,1-dimethylethyl)-4,6-dinitrophenol; 2,2'-butylidenebis[6-(1,1-dimethylethyl)-4-methylphenol; 4,4'-[thiobis(methylene)]bis[2,6-bis(1,1-dimethylethyl)phenol; 3-(1,1-dimethylethyl)-4-hydroxy-5-methylbenzenepropanoic acid, methyl ester; 2-(1,1-dimethylethyl)-4-(1-methylethyl)phenol; 4,4'-dithiobis[2,6-bis(1,1-dimethylethyl)]phenol; dimethylcarbamodithioic acid, [3,5-bis(1,1-dimethylethyl)-4-hydroxyphenyl]methyl ester; 2,6-bis(1,1-dimethylethyl)-4-(2-propen-1-yl)phenol; 3,5-bis(1,1-dimethylethyl)-4-hydroxybenzenepropanoic acid, nitrilotri-2,1-ethanediyl ester; 4,4'-thiobis[2,6-bis(1,1-dimethylethyl) phenol; 3,5-bis(1,1-dimethylethyl)-4-hydroxybenzenepropanoic acid; 3,5-bis(1,1-dimethylethyl)-1,2-benzenediol; 3,5-bis(1,1-dimethylethyl)-4-hydroxybenzenepropanoic acid hydrazide; 3,5-bis(1,1-dimethylethyl)-4-hydroxybenzenepropanoic acid, ethyl ester; 3,5-bis(1,1-dimethylethyl)-4-hydroxybenzoic acid, ethyl ester; 4,4'-[oxybis(methylene)]bis[2,6-bis(1,1-dimethylethyl)phenol; 2-[2-(4-chloro-2-nitrophenyl)diazenyl]-6-(1,1-dimethylethyl)-4-methylphenol; □-[3-[3-(2Hbenzotriazol-2-yl)-5-(1,1-dimethylethyl)-4-hydroxyphenyl]-1-oxopropyl]-□-hydroxy-poly(oxy-1,2-ethanediyl); 2,2'-methylenebis[4,6-bis(1,1-dimethylethyl)]phenol; 2,6-bis[[3-(1,1-dimethylethyl)-2-hydroxy-5-methylphenyl]methyl]-4- methylphenol; 2,6-bis(1,1-dimethylethyl)-4-nonylphenol; 3,3'-thiobispropanoic acid, 1,1'-bis[2-[3,5-bis(1,1-dimethylethyl)-4-hydroxyphenyl]ethyl]ester; 2-(1,1-dimethylethyl)-6-methyl-4-[3-[[2,4,8,10-tetrakis(1,1-dimethylethyl)dibenzo[d,f][1,3,2]dioxaphosphepin-6-yl]oxy]propyl] phenol; 2-(1,1-dimethylethyl)-1,4-Benzenediol, 4-acetate; 2,4-bis(1,1-dimethylethyl)-6-(1-phenylethyl)phenol; 3,4',5-tris(1,1-dimethylethyl)-[1,1'-Biphenyl]-4-ol; 3,3',5,5'-tetrakis(1,1-dimethylethyl)-[1,1'-Biphenyl]-2,2'-diol; 3-(2H-benzotriazol-2-yl)-5-(1,1-dimethylethyl)-4-hydroxybenzenepropanoic acid, methyl ester; 4-hydroxy-3,5-dimethylbenzonitrile; 2-[(2-hydroxy-3,5-dimethylphenyl)methyl]-4,6-dimethylphenol; 2-ethyl-6-methylphenol; 3,4-dihydro-2,2,5,7,8-pentamethyl-2H-1-benzopyran-6-ol; 4-hydroxy-3,5-dimethylbenzaldehyde; 3,4-dihydro-6-hydroxy-2,5,7,8-tetramethyl-2H-1-Benzopyran-2-carboxylic acid; 2,6-bis[(2-hydroxy-5-methylphenyl)methyl]-4-methylphenol; 2,2'-methylenebis[6-cyclohexyl-4-methylphenol]; 2,3,5,6-tetramethylphenol; 2,3,4,5,6-pentamethylphenol; and mixtures thereof.

In one aspect, preferred hindered phenols for use herein include, but are not limited to, 2,6-dimethyphenol; 2,6-diethylphenol; 2,6-bis(1-methylethyl)phenol; 2,4,6-trimethylphenol; 2-(1,1-dimethylethyl)-4-methoxyphenol; 3,5-bis(1,1-dimethylethyl)-4-hydroxy-benzoic acid; 3,5-bis(1,1-dimethylethyl)-2-hydroxy-benzoic acid; 3,5-bis(1,1-dimethylethyl)-4-hydroxy-benzenemethanol; 2-(2H-benzotriazol-2-yl)-4,6-bis(1,1-dimethylethyl)-phenol; 2-(1,1-dimethylethyl)-4-ethyl-phenol; 2-(1,1-dimethylethyl)-6-methyl-phenol; 2,2'-methylenebis[6-(1,1-dimethylethyl)-4-ethylphenol; 2,6-bis(1,1-dimethylethyl)-4-ethylphenol; 4,4'-thiobis[2-(1,1-dimethylethyl)-6-methylphenol; 3,5-bis(1,1-dimethylethyl)-4-hydroxybenzenepropanoic acid, 1,1'-[(1,2-dioxo-1,2-ethanediyl)bis(imino-2,1-ethanediyl)] ester; 2,6-bis(1,1-dimethylethyl)-4-nitrosophenol; 2,2'-thiobis[6-(1,1-dimethylethyl)-4-methylphenol; 2,6-bis(1,1-dimethylethyl)-4-(1-methylpropyl)phenol; 2,4-bis(1,1-dimethylethyl)-6-methylphenol; 2,2'-ethylidenebis[4,6-bis(1,1-dimethylethyl)]phenol; N,N'-1,3-propanediylbis[3,5-bis(1,1-dimethylethyl)-4-hydroxybenzenepropanamide; 2,6-bis(1,1-dimethylethyl)-1,4-benzenediol; 4,4'-(1-methylethylidene)bis[2-(1,1-dimethylethyl)phenol; 2-[[[3,5-bis(1,1-dimethylethyl)-4-hydroxyphenyl]methyl]thio] acetic acid, 2-ethylhexyl ester; 4-butyl-2,6-bis(1,1-dimethylethyl)phenol; phosphorous acid, 2-(1,1-dimethylethyl)-4-[1-[3-(1,1-dimethylethyl)-4-hydroxyphenyl]-1-methylethyl]phenyl bis(4-nonylphenyl) ester; 4,4'-(2,4,8,10-tetraoxaspiro[5.5]undecane-3,9-diyl)bis[2,6-bis(1,1-dimethylethyl)phenol]; 3-(5-chloro-2Hbenzotriazol-2-yl)-5-(1,1-dimethylethyl)-4-hydroxybenzenepropanoic acid, octyl ester; 4,4'-(1-methylethylidene)bis[2,6-bis(1,1-dimethylethyl)phenol; 3,5-bis(1,1-dimethylethyl)-4-hydroxybenzenepropanoic acid, 1,1',1"'-[(2,4,6-trioxo-1,3,5-triazine-1,3,5(2H,4H,6H)-triyl)tri-2,1-ethanediyl] ester; 2,6-bis(1-methylethyl)phenol; 2,6-diethylphenol; 2,6-dimethyl-1,4-benzenediol; 3,3',5,5'-tetramethyl-[1,1'-Biphenyl]-4,4'-diol; 2,6-bis(1,1-dimethylethyl)-4-(1-methylpropyl)phenol; 2,2'-methylenebis[4-methyl-6-(1-methylcyclohexyl)phenol; 3,5-bis(1,1-dimethylethyl)-[1,1'-Biphenyl]-4-ol; 4-(1,1-dimethylethyl)-2,6-dimethylphenol; 2,3,4,6-tetramethylphenol; 2,4,6-tris(1-methylethyl)phenol; 2,2'-(2-methylpropylidene)bis[4,6-dimethylphenol]; and mixtures thereof.

In another aspect, highly preferred hindered phenols for use herein include, but are not limited to, 2,6-bis(1-methylpropyl)phenol; 2,6-bis(1,1-dimethylethyl)-4-methyl-phenol; 2-(1,1-dimethylethyl)-1,4-benzenediol; 2,4-bis(1,1-dimethylethyl)-phenol; 2,6-bis(1,1-dimethylethyl)-phenol; 3,5-bis(1,1-dimethylethyl)-4-hydroxy-benzenepropanoic acid, methyl ester; 2-(1,1-dimethylethyl)-4-methylphenol; 2-(1,1-dimethylethyl)-4,6-dimethyl-phenol; 3,5-bis(1,1-dimethylethyl)-4-hydroxybenzenepropanoic acid, 1,1'-[2,2-bis[[3-[3,5-bis(1,1-dimethylethyl)-4-hydroxyphenyl]-1-oxopropoxy] methyl]-1,3-propanediyl] ester; 3,5-bis(1,1-dimethylethyl)-4-hydroxybenzenepropanoic acid, octadecyl ester; 2,2'-methylenebis[6-(1,1-dimethylethyl)-4-methylphenol; 2-(1,1-dimethylethyl)-phenol; 2,4,6-tris(1,1-dimethylethyl)-phenol; 4,4'-methylenebis[2,6-bis(1,1-dimethylethyl)-phenol; 4,4',4"-[(2,4,6-trimethyl-1,3,5-benzenetriyl)tris(methylene)]tris[2,6-bis(1,1-dimethylethyl)-phenol]; N,N'-1,6-hexanediylbis[3,5-bis(1,1-dimethylethyl)-4-hydroxybenzenepropanamide; 3,5-bis(1,1-dimethylethyl)-4-hydroxybenzoic acid, hexadecyl ester; P-[[3,5-bis(1,1-dimethylethyl)-4-hydroxyphenyl]methylphosphonic acid, diethyl ester; 1,3,5-tris[[3,5-bis(1,1-dimethylethyl)-4-hydroxyphenyl]methyl]-1,3,5-Triazine-2,4,6(1H,3H,5H)-trione; 3,5-bis(1,1-dimethylethyl)-4-hydroxybenzenepropanoic acid, 2-[3-[3,5-bis(1,1-dimethylethyl)-4-hydroxyphenyl]-1-oxopropyl]hydrazide; 3-(1,1-dimethylethyl)-4-hydroxy-5-methylbenzenepropanoic acid, 1,1'-[1,2-ethanediylbis(oxy-2,1-ethanediyl)] ester; 4-[(dimethylamino)methyl]-2,6-bis(1,1-dimethylethyl)phenol; 4-[[4,6-bis(octylthio)-1,3,5-triazin-2-yl]amino]-2,6-bis(1,1-dimethylethyl)phenol; 3,5-bis(1,1-dimethylethyl)-4-hydroxybenzenepropanoic acid, 1,1'-(thiodi-2,1-ethanediyl) ester; 3,5-bis(1,1-dimethylethyl)-4-hydroxybenzoic acid, 2,4-bis(1,1-dimethylethyl)phenyl ester; 3,5-bis(1,1-dimethylethyl)-4-hydroxybenzenepropanoic acid, 1,1'-(1,6-hexanediyl)ester; 3-(1,1-dimethylethyl)-4-hydroxy-5-methylbenzenepropanoic acid, 1,1'-[2,4,8,10-tetraoxaspiro[5.5]undecane-3,9-diylbis(2,2-dimethyl-2,1-ethanediyl)] ester; 3-(1,1-dimethylethyl)-☐-[3-(1,1-dimethylethyl)-4-hydroxyphenyl]-4-hydroxy-☐-methylbenzenepropanoic acid, 1,1'-(1,2-ethanediyl) ester; 2-[[3,5-bis(1,1-dimethylethyl)-4-hydroxyphenyl]methyl]-2-butylpropanedioic acid, 1,3-bis(1,2,2,6,6-pentamethyl-4-piperidinyl) ester; 3,5-bis(1,1-dimethylethyl)-4-hydroxybenzenepropanoic acid, 1-[2-[3-[3,5-bis(1,1-dimethylethyl)-4-hydroxyphenyl]-1-oxopropoxy]ethyl]-2,2,6,6-tetramethyl-4-piperidinyl ester; 3,4-dihydro-2,5,7,8-tetramethyl-2-[(4R,8R)-4,8,12-trimethyltridecyl]-(2R)-2H-1-benzopyran-6-ol; 2,6-dimethylphenol; 2,3,5-trimethyl-1,4-benzenediol; 2,4,6-trimethylphenol; 2,3,6-trimethylphenol; 4,4'-(1-methylethylidene)-bis[2,6-dimethylphenol]; 1,3,5-tris[[4-(1,1-dimethylethyl)-3-hydroxy-2,6-dimethylphenyl]methyl]-1,3,5-triazine-2,4,6(1H,3H,5H)-trione; 4,4'-methylenebis[2,6-dimethylphenol]; 2,6-bis(1-methylpropyl)phenol; and mixtures thereof.

One skilled in the arty would appreciate that hindered phenols may be used as the sole antioxidant to limit conversion of leuco colorants upon storage. For example, adequate color stability may be achieved exclusively through use of 2,6-bis(1,1-dimethylethyl)-4-methyl-phenol, or any of the other phenols listed above, such as 3,5-bis(1,1-dimethylethyl)-4-hydroxy-benzenepropanoic acid, methyl ester. As noted above, however, Applicants have found that incorporation of minor amounts of diarylamines provides better overall color stability.

In one aspect, the use of non-yellowing hindered phenol antioxidants is preferred. In yet another aspect, the use of a hindered phenol antioxidant known to form yellow byproducts may beneficial, for example to help offset the blue color formed by conversion of the leuco colorant in the laundry care formulation. Antioxidants that form such yellow by-products may be avoided if they lead to perceptible negative attributes in the consumer experience (such as deposition of yellow byproducts on fabric, for example). The skilled artisan is able to make informed decisions regarding the selection of antioxidants to employ.

Additional antioxidants may be employed. Examples of suitable antioxidants for use in the composition include, but are not limited to, the group consisting of α-, β-, γ-, δ-tocopherol, ethoxyquin, 2,2,4-trimethyl-1,2-dihydroquinoline, 2,6-di-tert-butyl hydroquinone, tert-butyl hydroxyanisole, lignosulphonic acid and salts thereof, and mixtures thereof. It is noted that ethoxyquin (1,2-dihydro-6-ethoxy-2,2,4-trimethylquinoline) is marketed under the name Raluquin™ by the company Raschig™.

Other types of anti-oxidants that may be used in the composition are 6-hydroxy-2,5,7,8-tetramethylchroman-2-carboxylic acid (Trolox™) and 1,2-benzisothiazoline-3-one (Proxel GXL™).

Anti-oxidants such as tocopherol sorbate, butylated hydroxyl benzoic acids and their salts, gallic acid and its alkyl esters, uric acid and its salts, sorbic acid and its salts, and dihydroxyfumaric acid and its salts may also be used.

In one aspect, the mole ratio of the hindered phenol antioxidant to the substituted diarylamine antioxidant is greater than 1.0:1.0, preferably more than 2.0:1.0, more preferably greater than 5.0:1.0, most preferably greater than 10.0, 20.0 or even 30.0:1.0. Over time upon storage, the mole ratio of the hindered phenol antioxidant to the substituted diarylamine antioxidant in the laundry care composition will change depending on the rates of consumption of each antioxidant. One skilled in the art realizes that in a laundry care formulation where the hindered phenol antioxidant is consumed more rapidly than the substituted diarylamine, the formulation may eventually have a mole ratio of the hindered phenol antioxidant to the substituted diarylamine antioxidant that is less than 1.0:1.0.

Without wishing to be bound by theory, the benefit of this combination is believed to be attributable to the combination of a stoichiometric hindered phenol antioxidant that forms a thermodynamically more stable radical and a catalytic substituted diarylamine antioxidant that is kinetically faster to react than the hindered phenol but forms a somewhat less stable radical. Surprisingly little substituted diarylamine co-antioxidant is required to suppress conversion during storage, compared to the use of a hindered phenol alone. The foregoing combination of hindered phenol(s) and substituted diarylamine derivatives has been found to impart a significantly greater degree of protection to leuco colorants against oxidative degradation than either of these materials employed separately.

The substituted diarylamines that are useful in the practice of this invention can be represented by the general formula

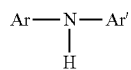

wherein Ar and Ar' are each independently selected aryl radicals, wherein at least one aryl radical is substituted.

In one aspect, the invention relates to a composition comprising one or more substituted diarylamine antioxidants conforming to the group selected from:

(a)

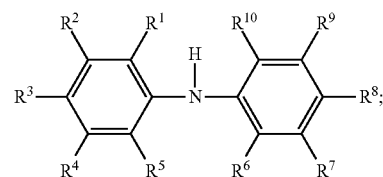
(XI)

(b)

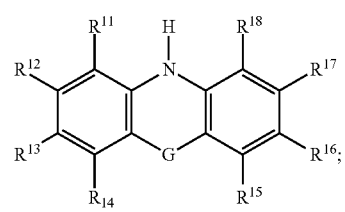
(XII)

(c)

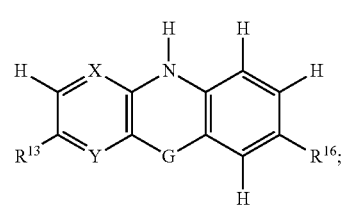
(XIII)

(d)

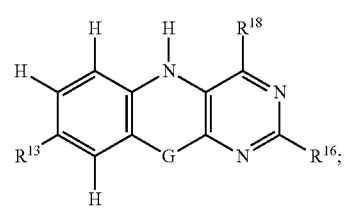
(XIV)

(e)

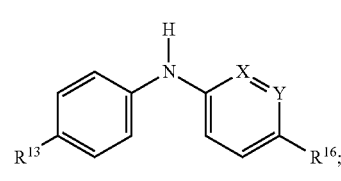
(XV)

(f)

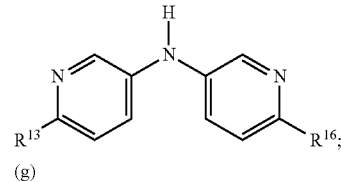
(XVI)

(g)

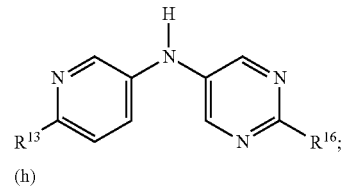
(XVII)

(h)

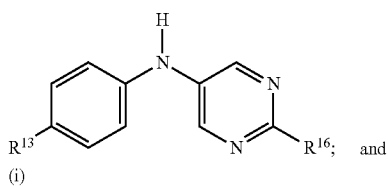

(XVIII)

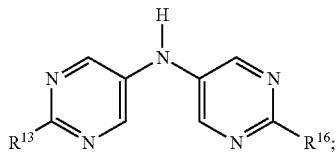

(XIX)

(j) mixtures thereof;
wherein either X is N and Y is C—H, or X is C—H and Y is N; wherein G, when present, is selected from the group consisting of O, S, Se, —CH=CH—, and —(CH$_2$)$_n$— wherein n=0, 1 or 2; and wherein at least one aryl ring is substituted with a non-H moiety as disclosed immediately below.

In the structure of formula (XI), $R^1$, $R^4$, $R^5$, $R^6$, $R^9$, and $R^{10}$ are independently selected from H and $C_1$-$C_{12}$ alkyl; more preferably $R^4$ and $R^9$ are H and $R^1$, $R^5$, $R^6$, and $R^{10}$ are independently selected from H and $C_1$-$C_4$ alkyl; $R^2$ and $R^7$ are independently H or may join together with $R^3$ or $R^8$, respectively, to form a fused aromatic ring; $R^3$ and $R^8$, when not so joined with $R^2$ or $R^7$, respectively, are independently selected from the group consisting of H, $C_1$-$C_{12}$ alkyl, —CF$_3$, —NO$_2$, —CN, —Cl, —Br, —F, $C_6$-$C_{12}$ aryl (preferably phenyl), $C_7$-$C_{12}$ alkaryl, —OR, —SO$_2$N(R)$_2$, and —N(R)$_2$, wherein each R is independently selected from H, $C_1$-$C_{12}$ alkyl, substituted $C_1$-$C_{12}$ alkyl, $C_6$-$C_{10}$ aryl, substituted $C_6$-$C_{10}$ aryl, $C_7$-$C_{12}$ alkaryl, substituted $C_7$-$C_{12}$ alkaryl, alkyleneoxy, and polyalkyleneoxy moieties.

In the structure of formulas (XII)-(XIX), $R^1$, $R^{12}$, $R^{14}$, $R^{15}$, $R^{17}$, and $R^{18}$ are independently selected from H and $C_1$-$C_{12}$ alkyl, more preferably H and $C_1$-$C_4$ alkyl; $R^{13}$ and $R^{16}$ are independently selected from the group consisting of H, $C_1$-$C_{12}$ alkyl, —CF$_3$, —NO$_2$, —CN, —Cl, —Br, —F, $C_6$-$C_{12}$ aryl (preferably phenyl), $C_7$-$C_{12}$ alkaryl, —OR, —SO$_2$N(R)$_2$, and —N(R)$_2$, wherein each R is independently selected from H, $C_1$-$C_{12}$ alkyl, substituted $C_1$-$C_{12}$ alkyl, $C_6$-$C_{10}$ aryl, substituted $C_6$-$C_{10}$ aryl, $C_7$-$C_{12}$ alkaryl, substituted $C_7$-$C_{12}$ alkaryl, alkyleneoxy, and polyalkyleneoxy moieties.

In one aspect, R in structures (XI)-(XIX) above is an alkyleneoxy or polyalkyleneoxy group selected from EO, PO, BO, and mixtures thereof, more preferably from EO alone or from EO/PO mixtures. Where any substituted diarylamine comprises an R group with three or more contiguous monomers, that antioxidant is defined herein as a "polymeric diarylamine antioxidant".

As noted above, in some instances the hindered phenol antioxidant or the diarylamine antioxidant comprises an alkyleneoxy or polyalkyleneoxy moiety. In one aspect, the alkyleneoxy or polyalkyleneoxy moiety comprises at least one ethylene oxide group and optionally at least one propylene oxide group. In another aspect, the alkyleneoxy or polyalkyleneoxy moiety comprises from 1 to about 50 ethylene oxide groups and optionally from 1 to about 20 propylene oxide groups. In such polyalkyleneoxy moieties, the different alkyleneoxy groups can be arranged in a block configuration or in a random configuration. In one aspect, the alkyleneoxy groups of the polyalkyleneoxy moiety are arranged in a block configuration.

The alkyleneoxy or polyalkyleneoxy moiety can be covalently bound to the hindered phenol or the diarylamine antioxidant through any suitable linking group. In one aspect, the alkyleneoxy or polyalkyleneoxy moiety is coavalently bound to the diarylamine antioxidant through a linking group selected from the group consisting of an oxygen atom and a nitrogen atom. When the linking group is an oxygen atom, one valence of the oxygen atom is occupied by the alkyleneoxy or polyalkyleneoxy moiety and the second valence of the oxygen atom is occupied by the remainder of the hindered phenol or diarylamine antioxidant. When the linking group is a nitrogen atom, one valence of nitrogen atom is occupied by the remainder of the hindered phenol or diarylamine antioxidant and one valence of the nitrogen atom is occupied by the alkyleneoxy or polyalkyleneoxy moiety. The remaining valence of the nitrogen atom can be occupied by any suitable group, such as a second alkyleneoxy or polyalkyleneoxy moiety. In one aspect, the alkyleneoxy or polyalkyleneoxy moiety preferably is covalently bound to the hindered phenol or the diarylamine antioxidant through a nitrogen atom. In such embodiment, the nitrogen atom and the alkyleneoxy or polyalkyleneoxy moiety together have the structure —NR(C$_2$H$_4$O)$_n$(C$_3$H$_6$O)$_q$H, where n is independently selected from integers from 1 to 50, q is independently selected from 0 to 20, and R is selected from H, $C_1$-$C_{12}$ alkyl, substituted $C_1$-$C_{12}$ alkyl, $C_6$-$C_{10}$ aryl, substituted $C_6$-$C_{10}$ aryl, $C_7$-$C_{12}$ alkaryl, substituted $C_7$-$C_{12}$ alkaryl, alkyleneoxy, and polyalkyleneoxy moieties. In another aspect, the antioxidant compound comprises two independently selected alkyleneoxy or polyalkyleneoxy moieties, each moiety being covalently bound to the antioxidant moiety through a nitrogen atom, the nitrogen atom and the moieties together having the structure

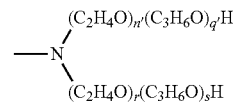

where the indices n' and r are independently selected from integers from 1 to 50, the sum of n' and r is from 2 to 50, the indices q' and s are independently selected from integers from 0 to 20, and the sum of q' and s is from 0 to 20.

In one aspect, the substituted diarylamine antioxidant is selected from the group consisting of N,N-dihexyl-5H-Pyrimido[4,5-b][1,4]benzoxazin-2-amine, N,N-diethyl-5H-Pyrimido[4,5-b][1,4]benzothiazin-2-amine, N$^5$-[4-(1,1-dimethylethyl)phenyl]-N$^2$,N$^2$-dihexyl-2,5-Pyridinediamine, N$^5$-[4-(1,1-dimethylethyl)phenyl]-N$^2$,N$^2$-dihexyl-2,5-Pyrimidinediamine, N,N-dihexyl-5H-Pyrimido[4,5-b][1,4]benzothiazin-2-amine, N,N-diethyl-5H-Pyrimido[4,5-b][1,4]benzoxazin-2-amine, 2-(1-pyrrolidinyl)-5H-Pyrimido[4,5-b][1,4]benzothiazine, 8-(1,1-dimethylethyl)-2-heptyl-4-methyl-5H-Pyrimido[4,5-b][1,4]benzoxazine, N$^5$-[4-(1,1-dimethylethyl)phenyl]-N$^2$,N$^2$-dioctyl-2,5-Pyrimidinediamine, N$^5$-[4-(1,1-dimethylethyl)phenyl]-N$^2$,N$^2$-dimethyl-2,5-Pyridinediamine, N$^5$-[4-(1,1-dimethylethyl)phenyl]-N$^2$,N$^2$-dimethyl-2,5-Pyrimidinediamine, N$^2$,N$^2$-dibutyl-N$^5$-(2-hexyl-5-pyrimidinyl)-2,5-Pyrimidinediamine, N$^2$,N$^2$-dihexyl-N$^5$-phenyl-2,5-Pyrimidinediamine, N$^2$,N$^2$-dihexyl-N$^5$-phenyl-2,5-Pyridinediamine, N$^2$,N$^2$-dibutyl-N$^5$-[2-(dibutylamino)-5-pyrimidinyl]-2,5-Pyrimidinediamine, N$^2$,N$^2$-dibutyl-N$^5$-

[6-(dihexylamino)-3-pyridinyl]-2,5-Pyrimidinediamine, $N^5$-[2-(dimethylamino)-5-pyrimidinyl]-$N^2$,$N^2$-dimethyl-2,5-Pyrimidinediamine, $N^5$-[6-(dimethylamino)-3-pyridinyl]-$N^2$,$N^2$-dimethyl-2,5-Pyrimidinediamine, $N^2$,$N^2$-dimethyl-$N^5$-5-pyrimidinyl-2,5-Pyrimidinediamine, $N^2$,$N^2$-dimethyl-N-3-pyridinyl-2,5-Pyrimidinediamine, $N^2$,$N^2$-dimethyl-$N^5$-5-pyrimidinyl-2,5-Pyridinediamine, $N^2$,$N^2$-dimethyl-N-3-pyridinyl-2,5-Pyridinediamine, 6-octyl-N-(6-octyl-3-pyridinyl)-3-Pyridinamine, 6-(1-methyl-1-phenylethyl)-N-[6-(1-methyl-1-phenylethyl)-3-pyridinyl]-3-Pyridinamine, 6-butoxy-N-[6-(2-phenylethoxy)-3-pyridinyl]-3-Pyridinamine, N-(6-heptyl-3-pyridinyl)-2-hexyl-5-Pyrimidinamine, $N^5$-[4-(dipropylamino)phenyl]-$N^2$,$N^2$-dipropyl-2,5-Pyrimidinediamine, $N^5$-[6-(dipentylamino)-3-pyridinyl]-$N^2$,$N^2$-dipentyl-2,5-Pyridinediamine, $N^1$,$N^1$-dimethyl-$N^4$-5-pyrimidinyl-1,4-Benzenediamine, 2-methoxy-N-(4-methoxyphenyl)-5-Pyrimidinamine, 6-(1-hexyn-1-yl)-N-[6-(1-hexyn-1-yl)-3-pyridinyl]-3-Pyridinamine, 2-(2-phenylethoxy)-N-[4-(2-phenylethoxy)phenyl]-5-Pyrimidinamine, 2-(cyclohexyloxy)-N-phenyl-5-Pyrimidinamine, N-(4-butylphenyl)-5-Pyrimidinamine, N-(4-butylphenyl)-3-Pyridinamine, 2-heptyl-N-phenyl-5-Pyrimidinamine, 6-hexyl-N-phenyl-3-Pyridinamine, 1,9-bis(1,1-dimethylethyl)-10H-Phenothiazine, $N^1$,$N^1$-dimethyl-$N^4$-2-pyridinyl-1,4-Benzenediamine, 6-methyl-N-(6-methyl-3-pyridinyl)-3-Pyridinamine, N-[4-(dodecyloxy)phenyl]-5-Pyrimidinamine, N-(4-butoxyphenyl)-3-Pyridinamine, 2-(heptyloxy)-N-phenyl-5-Pyrimidinamine, 6-methoxy-N-phenyl-3-Pyridinamine, $N^1$,$N^1$-dibutyl-$N^4$-5-pyrimidinyl-1,4-Benzenediamine, $N^2$,$N^2$-dimethyl-$N^5$-phenyl-2,5-Pyrimidinediamine, $N^2$,$N^2$-dimethyl-$N^5$-phenyl-2,5-Pyridinediamine, N-(6-butoxy-3-pyridinyl)-2-(2-phenylethoxy)-5-Pyrimidinamine, 6-methoxy-N-(6-methoxy-3-pyridinyl)-3-Pyridinamine, N-(4-butoxyphenyl)-2-(2-phenylethoxy)-5-Pyrimidinamine, 6-methoxy-N-(4-methoxyphenyl)-3-Pyridinamine, $N^5$-[6-(diethylamino)-3-pyridinyl]-$N^2$,$N^2$-dimethyl-2,5-Pyrimidinediamine, 2-heptyl-N-(6-heptyl-3-pyridinyl)-5-Pyrimidinamine, N-(4-butylphenyl)-2-heptyl-5-Pyrimidinamine, N-(4-methoxyphenyl)-5-Pyrimidinamine, N-3-pyridinyl-5-Pyrimidinamine, $N^1$,$N^1$-dipropyl-$N^4$-5-pyrimidinyl-1,4-Benzenediamine, $N^5$-[2-(diethylamino)-5-pyrimidinyl]-$N^2$,$N^2$-diethyl-2,5-Pyrimidinediamine, $N^5$-[6-(dimethylamino)-3-pyridinyl]-$N^2$,$N^2$-diethyl-2,5-Pyrimidinediamine, $N^5$-[6-(dimethylamino)-3-pyridinyl]-$N^2$,$N^2$-dimethyl-2,5-Pyridinediamine, $N^5$-[4-(dimethylamino)phenyl]-$N^2$,$N^2$-dimethyl-2,5-Pyrimidinediamine, $N^5$-[4-(dimethylamino)phenyl]-$N^2$,$N^2$-dimethyl-2,5-Pyridinediamine, 2-heptyl-N-(2-heptyl-5-pyrimidinyl)-5-Pyrimidinamine, 2-heptyl-N-(6-hexyl-3-pyridinyl)-5-Pyrimidinamine, 6-hexyl-N-(6-hexyl-3-pyridinyl)-3-Pyridinamine, N-(4-butylphenyl)-2-hexyl-5-Pyrimidinamine, N-(4-butylphenyl)-6-hexyl-3-Pyridinamine, N-5-pyrimidinyl-5-Pyrimidinamine, 4-butyl-N-(4-methylphenyl)-Benzenamine, $N^1$,$N^1$-dimethyl-$N^4$-3-pyridinyl-1,4-Benzenediamine, N-(4-methoxyphenyl)-3-Pyridinamine, 1,9-dimethyl-10H-Phenothiazine, N-phenyl-5-Pyrimidinamine, 4-(trifluoromethyl)-N-[4-(trifluoromethyl)phenyl]-Benzenamine, N-phenyl-2-Pyridinamine, 2,4,6-trimethyl-N-(2,4,6-trimethylphenyl)Benzenamine, N-phenyl-3-Pyridinamine, 4-(1,1-dimethylethyl)-N-[4-(1,1-dimethylethyl)phenyl]Benzenamine, $N^1$,$N^1$-dimethyl-$N^4$-phenyl-1,4-Benzenediamine, N-3-pyridinyl-3-Pyridinamine, 4-nitro-N-(4-nitrophenyl)Benzenamine, N-[1,1'-biphenyl]-4-yl-[1,1'-Biphenyl]-4-amine, 4-heptyl-N-(4-heptylphenyl)-Benzenamine, 4-(1-phenylethyl)-N-[4-(1-phenylethyl)phenyl]-Benzenamine, 4,4'-iminobis-Benzonitrile, 4-nonyl-N-(4-nonylphenyl)-Benzenamine, N-(2,4-dimethylphenyl)-2,4-dimethyl-Benzenamine, 4-(1,1,3,3-tetramethylbutyl)-N-[4-(1,1,3,3-tetramethylbutyl)phenyl]-Benzenamine, 4-(1-methyl-1-phenylethyl)-N-[4-(1-methyl-1-phenylethyl)phenyl]-Benzenamine, 4-octyl-N-(4-octylphenyl)-Benzenamine, 3,7-dichloro-10H-Phenothiazine, 3,7-dimethoxy-10H-Phenothiazine, 4-methoxy-N-phenyl-Benzenamine, $N^4$-[4-(dimethylamino)phenyl]-$N^1$,$N^1$-dimethyl-1,4-Benzenediamine, 4-methyl-N-(4-methylphenyl)Benzenamine, 1,9-bis(1,1-dimethylethyl)-10H-Phenothiazine, 1,9-dimethyl-10 OH-Phenothiazine, 3,7-dichloro-10H-Phenothiazine, 3,7-dimethoxy-10H-Phenothiazine, 10,11-dihydro-5H-Dibenz[b,f]azepine, 10H-Phenoselenazine, 5H-Dibenz[b,f]azepine, 10H-Phenoxazine, 10H-Phenothiazine, 9,10-dihydro-Acridine, 9H-Carbazole, 2-(trifluoromethyl)-10H-Phenoxazine, 2-(1,1-dimethylethyl)-10H-Phenoxazine, 3-(trifluoromethyl)-10H-Phenoxazine, 3,7-bis(trifluoromethyl)-10H-Phenoxazine, 3-(1,1-dimethylethyl)-10H-Phenoxazine, 3-(N,N-diethylsulfonyl)-10H-Phenoxazine, 10H-Phenoxazine-3-carbonitrile, 3-nitro-10H-Phenoxazine, 3-methoxy-10H-Phenoxazine, 2,4,6,8-tetrakis(1,1-dimethylethyl)-10H-Phenoxazine, 2,8-bis(1,1-dimethylethyl)-10H-Phenoxazine, 3-methoxy-7-nitro-10H-Phenoxazine, 7-nitro-10H-Phenoxazine-3-carbonitrile, 3,7-dimethoxy-10H-Phenoxazine, 3,7-bis(1,1-dimethylethyl)-10H-Phenoxazine, 7-fluoro-10H-Phenoxazine-3-carbonitrile, 7-(diethylamino)-10H-Phenoxazine-3-carbonitrile, 10H-Phenoxazine-2,3-dicarbonitrile, 3,7-dinitro-10H-Phenoxazine, 2-methyl-3-nitro-10H-Phenoxazine, 2-ethyl-3-nitro-10H-Phenoxazine, N,N-diethyl-7-nitro-10H-Phenoxazin-3-amine, 2,3-dinitro-10H-Phenoxazine, 7-chloro-2-ethyl-3-nitro-10H-Phenoxazine, N,N-diethyl-7-methoxy-10H-Phenoxazin-3-amine, and mixtures thereof.

In one aspect, the use of non-yellowing substituted diarylamine antioxidants is preferred. In yet another aspect, the use of a substituted diarylamine antioxidant known to form yellow byproducts may be beneficial, for example to help offset the blue color formed by conversion of the leuco colorant in the laundry care formulation. Antioxidants that form such yellow by-products may be avoided if they lead to perceptible negative attributes in the consumer experience (such as deposition of yellow byproducts on fabric, for example). The skilled artisan is able to make informed decisions regarding the selection of antioxidants to employ.

In one aspect, a more hydrophilic antioxidant may be preferred, being more readily removed from the fabric during the rinse step of the wash cycle compared to the removal of less hydrophilic antioxidants. As is known to the skilled artisan, the water solubility can be improved by attaching one or more hydrophilic groups to the antioxidant. The hydrophilic group can be ionic, such as a sulfate, phosphate, or carboxylate group, a quaternary ammonium, or a betaine. The hydrophilic group can also be non-ionic, such as hydroxy group, or a polymer (or a copolymer) chain comprising one or more hydrophilic monomers. Suitable hydrophilic monomers include, but are not limited to, ethylene oxide, ethylene imine, 2-hydroxylethyl (meth)acrylate, 1-vinyl-2-pyrrolidone, and vinyl alcohol. In one aspect, the antioxidant preferably has a partition coefficient (n-octanol/water) of less than 500000, more preferably less than 10000, even more preferably less than 500, and most preferably less than 10, as measured per the EPA test guidelines OPPTS 830.7550.

In one aspect, preferred antioxidants with hydrophilic groups may be selected from the group of the following structures;

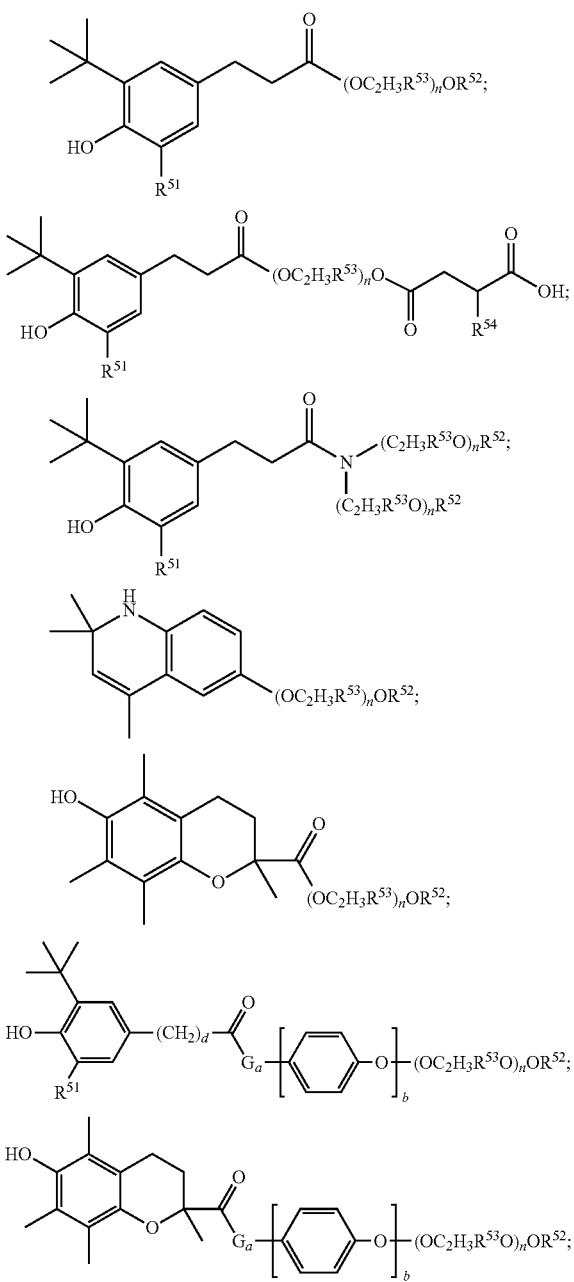

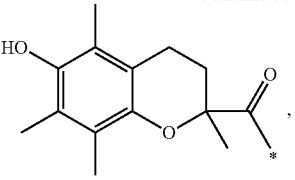

wherein the * indicates the point of attachment; each $R^{53}$ is independently selected from the group consisting of hydrogen, or $CH_3$; $R^{54}$ is selected from the group consisting of H, C1 to C16 alkyl, and C2 to C16 alkenyl; G is selected from Oxygen, Sulfur, or substituted nitrogen; a is 0 or 1; b is 0 or 1; d is 0 to 2, preferably 2; c, n, and (x+y) can be any integer from 1 to 100. More preferably, c, n, and either x or y are greater than 3.

The present invention relates to a class of leuco colorants that may be useful for use in laundry care compositions, such as liquid laundry detergent, to provide a hue to whiten textile substrates. Leuco colorants are compounds that are essentially colorless or only lightly colored but are capable of developing an intense color upon activation. One advantage of using leuco compounds in laundry care compositions is that such compounds, being colorless until activated, allow the laundry care composition to exhibit its own color. The leuco colorant generally does not alter the primary color of the laundry care composition. Thus, manufacturers of such compositions can formulate a color that is most attractive to consumers without concern for added ingredients, such as bluing agents, affecting the final color value of the composition.

The amount of leuco compound used in the compositions of the present invention may be any level suitable to achieve the aims of the invention. In one aspect, the composition comprises leuco compound in an amount from about 1 wt % to about 99 wt %, preferably from 2 wt % to about 50 wt %, even more preferably from about 5 wt % to about 20 wt %.

In another aspect, the composition comprises leuco colorant in an amount from 5.0 to 3000 milliequivalents/kg, preferably from 10 to 1500 milliequivalents/kg, even more preferably from 25 to 600 milliequivalents/kg, wherein the units of milliequivalents/kg refer to the milliequivalents of leuco moiety per kg of the composition. For leuco colorants comprising more than one leuco moiety, the number of milliequivalents is related to the number of millimoles of the leuco colorant by the following equation: (millimoles of leuco colorant) x (no. of milliequivalents of leuco moiety/millimole of leuco colorant)=milliequivalents of leuco moiety.

In instances where there is only a single leuco moiety per leuco colorant, the number of milliequivalents/kg will be equal to the number of millimoles of leuco colorant/kg of the composition.

In one aspect, the invention relates to a leuco composition selected from the group consisting of a diarylmethane leuco, a triarylmethane leuco, an oxazine leuco, a thiazine leuco, a hydroquinone leuco, an arylaminophenol leuco and mixtures thereof.

Suitable diarylmethane leuco compounds for use herein include, but are not limited to, diarylmethylene derivatives capable of forming a second colored state as described herein.

Suitable examples include, but are not limited to, Michler's methane, a diarylmethylene substituted with an —OH group (e.g., Michler's hydrol) and ethers and esters and mixtures thereof, wherein $R^{51}$ is selected from the group consisting of hydrogen and C1 to C4 alkyl, preferably $CH_3$ and t-butyl; each $R^{52}$ is independently selected from the group consisting of hydrogen, $CH_3$, $SO_3Na$, a succinate group, and a radical conforming to:

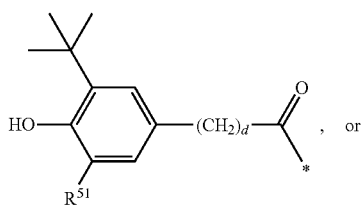

thereof, a diarylmethylene substituted with a photocleavable moiety, such as a —CN group (bis(para-N,N-dimethyl)phenyl)acetonitrile), and similar such compounds.

In one aspect, the invention relates to a composition comprising one or more leuco compounds conforming to the group selected from:

(a)

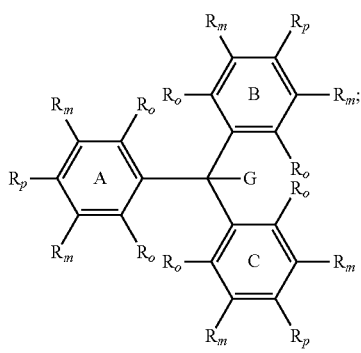

(I)

(b)

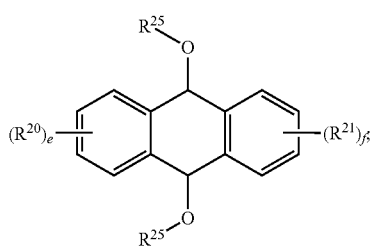

(II)

(c)

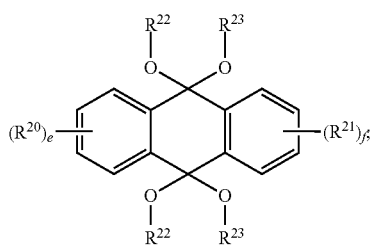

(III)

(d)

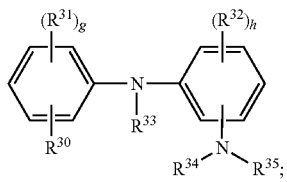

(IV)

(e)

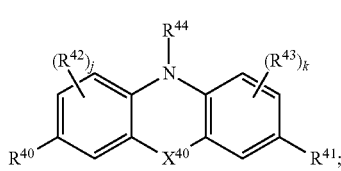

(V)

and
(f) mixtures thereof;
wherein the ratio of Formula I-V to its oxidized form is at least 1:19, 1:9, or 1:3, preferably at least 1:1, more preferably at least 3:1, most preferably at least 9:1 or even 19:1.

In the structure of Formula (I), each individual $R_o$, $R_m$ and $R_p$ group on each of rings A, B and C is independently selected from the group consisting of hydrogen, deuterium and $R^5$; each $R^5$ is independently selected from the group consisting of halogens, nitro, alkyl, substituted alkyl, aryl, substituted aryl, alkaryl, substituted alkaryl, —$(CH_2)_n$—O—$R^1$, —$(CH_2)_n$—$NR^1R^2$, —$C(O)R^1$, —$C(O)OR^1$, —$C(O)O^-$, —$C(O)NR^1R^2$, —$OC(O)R^1$, —$OC(O)OR^1$, —$OC(O)NR^1R^2$, —$S(O)_2R^1$, —$S(O)_2OR^1$, —$S(O)_2O^-$, —$S(O)_2NR^1R^2$, —$NR^1C(O)R^2$, —$NR^1C(O)OR^2$, —$NR^1C(O)SR^2$, —$NR^1C(O)NR^2R^3$, —$P(O)_2R^1$, —$P(O)(OR^1)_2$, —$P(O)(OR^1)O^-$, and —$P(O)(O^-)_2$, wherein the index n is an integer from 0 to 4, preferably from 0 to 1, most preferably 0; wherein two $R_o$ on different A, B and C rings may combine to form a fused ring of five or more members; when the fused ring is six or more members, two $R_o$ on different A, B and C rings may combine to form an organic linker optionally containing one or more heteroatoms; in one embodiment two $R_o$ on different A, B and C rings combine to form a heteroatom bridge selected from —O— and —S— creating a six member fused ring; an $R_o$ and $R_m$ on the same ring or an $R_m$ and $R_p$ on the same ring may combine to form a fused aliphatic ring or fused aromatic ring either of which may contain heteroatoms; on at least one of the three rings A, B or C, preferably at least two, more preferably at least three, most preferably all four of the $R_o$ and $R_m$ groups are hydrogen, preferably all four $R_o$ and $R_m$ groups on at least two of the rings A, B and C are hydrogen; in some embodiments, all $R_o$ and $R_m$ groups on rings A, B and C are hydrogen; preferably each $R_p$ is independently selected from hydrogen, —$OR^1$ and —$NR^1R^2$; no more than two, preferably no more than one of $R_p$ is hydrogen, preferably none are hydrogen; more preferably at least one, preferably two, most preferably all three $R_p$ are —$NR^1R^2$; in some embodiments, one or even two of the Rings A, B and C may be replaced with an independently selected $C_3$-$C_9$ heteroaryl ring comprising one or two heteroatoms independently selected from O, S and N, optionally substituted with one or more independently selected $R^5$ groups; G is independently selected from the group consisting of hydrogen, deuterium, $C_1$-$C_{16}$ alkoxide, phenoxide, bisphenoxide, nitrite, nitrile, alkyl amine, imidazole, arylamine, polyalkylene oxide, halides, alkylsulfide, aryl sulfide, or phosphine oxide; in one aspect the fraction [(deuterium)/(deuterium+hydrogen)] for G is at least 0.20, preferably at least 0.40, even more preferably at least 0.50 and most preferably at least 0.60 or even at least 0.80; wherein any two of $R^1$, $R^2$ and $R^3$ attached to the same heteroatom can combine to form a ring of five or more members optionally comprising one or more additional heteroatoms selected from the group consisting of —O—, —$NR^{15}$—, and —S—.

In the structure of Formula (II)-(III), e and f are independently integers from 0 to 4; each $R^{20}$ and $R^{21}$ is independently selected from the group consisting of halogens, a nitro group, alkyl groups, substituted alkyl groups, —NC(O)$OR^1$, —NC(O)$SR^1$, —$OR^1$, and —$NR^1R^2$; each $R^{25}$ is independently selected from the group consisting of monosaccharide moiety, disaccharide moiety, oligosaccharide moiety, and polysaccharide moiety, —$C(O)R^1$, —$C(O)OR^1$, —$C(O)NR^1R^2$; each $R^{22}$ and $R^{23}$ is independently selected from the group consisting of hydrogen, alkyl groups, and substituted alkyl groups.

In the structure of Formula (IV), wherein $R^{30}$ is positioned ortho or para to the bridging amine moiety and is selected from the group consisting of —OR$^{38}$ and —NR$^{36}$R$^{37}$, each R$^{36}$ and R$^{37}$ is independently selected from the group consisting of hydrogen, alkyl groups, substituted alkyl groups, aryl groups, substituted aryl groups, acyl groups, R$^4$, —C(O)OR$^1$, —C(O)R$^1$, and —C(O)NR$^1$R$^2$; R$^{38}$ is selected from the group consisting of hydrogen, acyl groups, —C(O)OR$^1$, —C(O)R$^1$, and —C(O)NR$^1$R$^2$; g and h are independently integers from 0 to 4; each R$^{31}$ and R$^{32}$ is independently selected from the group consisting of alkyl groups, substituted alkyl groups, aryl groups, substituted aryl groups, alkaryl, substituted alkaryl, —(CH$_2$)$_n$—O—R$^1$, —(CH$_2$)$_n$—NR$^1$R$^2$, —C(O)R$^1$, —C(O)OR$^1$, —C(O)O$^-$, —C(O)NR$^1$R$^2$, —OC(O)R$^1$, —OC(O)OR$^1$, —OC(O)NR$^1$R$^2$, —S(O)$_2$R$^1$, —S(O)$_2$OR$^1$, —S(O)$_2$O$^-$, —S(O)$_2$NR$^1$R$^2$, —NR$^1$C(O)R$^2$, —NR$^1$C(O)OR$^2$, —NR$^1$C(O)SR$^2$, —NR$^1$C(O)NR$^2$R$^3$, —OR$^1$, —NR$^1$R$^2$, —P(O)$_2$R$^1$, —P(O)(OR$^1$)$_2$, —P(O)(OR$^1$) O$^-$, and —P(O)(O$^-$)$_2$, wherein the index n is an integer from 0 to 4, preferably from 0 to 1, most preferably 0; —NR$^{34}$R$^{35}$ is positioned ortho or para to the bridging amine moiety and R$^{34}$ and R$^{35}$ are independently selected from the group consisting of hydrogen, alkyl, substituted alkyl, aryl, substituted aryl, alkaryl, substituted alkaryl, and R$^4$; R$^{33}$ is independently selected from the group consisting of hydrogen, —S(O)$_2$R$^1$, —C(O)N(H)R$^1$; —C(O)OR$^1$; and —C(O) R$^1$; when g is 2 to 4, any two adjacent R$^{31}$ groups may combine to form a fused ring of five or more members wherein no more than two of the atoms in the fused ring may be nitrogen atoms.

In the structure of Formula (V), wherein X$^{40}$ is selected from the group consisting of an oxygen atom, a sulfur atom, and NR$^{45}$; R$^{45}$ is independently selected from the group consisting of hydrogen, deuterium, alkyl, substituted alkyl, aryl, substituted aryl, alkaryl, substituted alkaryl, —S(O)$_2$ OH, —S(O)$_2$O$^-$, —C(O)OR$^1$, —C(O)R$^1$, and —C(O) NR$^1$R$^2$; R$^{40}$ and R$^{41}$ are independently selected from the group consisting of —(CH$_2$)$_n$—O—R$^1$, —(CH$_2$)$_n$—NR$^1$R$^2$, wherein the index n is an integer from 0 to 4, preferably from 0 to 1, most preferably 0; j and k are independently integers from 0 to 3; R$^{42}$ and R$^{43}$ are independently selected from the group consisting of alkyl, substituted alkyl, aryl, substituted aryl, alkaryl, substituted alkaryl, —S(O)$_2$R$^1$, —C(O)NR$^1$R$^2$, —NC(O)OR$^1$, —NC(O)SR$^1$, —C(O)OR$^1$, —C(O)R$^1$, —(CH$_2$)$_n$—O—R$^1$, —(CH$_2$)$_n$—NR$^1$R$^2$, wherein the index n is an integer from 0 to 4, preferably from 0 to 1, most preferably 0; R$^{44}$ is —C(O)R$^1$, —C(O)NR$^1$R$^2$, and —C(O) OR$^1$.

In the structures of Formula (I)-(V), any charge present in any of the preceeding groups is balanced with a suitable independently selected internal or external counterion. Suitable independently selected external counterions may be cationic or anionic. Examples of suitable cations include but are not limited to one or more metals preferably selected from Group I and Group II, the most preferred of these being Na, K, Mg, and Ca, or an organic cation such as iminium, ammonium, and phosphonium. Examples of suitable anions include but are not limited to: fluoride, chloride, bromide, iodide, perchlorate, hydrogen sulfate, sulfate, aminosulfate, nitrate, dihydrogen phosphate, hydrogen phosphate, phosphate, bicarbonate, carbonate, methosulfate, ethosulfate, cyanate, thiocyanate, tetrachlorozincate, borate, tetrafluoroborate, acetate, chloroacetate, cyanoacetate, hydroxyacetate, aminoacetate, methylaminoacetate, di- and tri-chloroacetate, 2-chloro-propionate, 2-hydroxypropionate, glycolate, thioglycolate, thioacetate, phenoxyacetate, trimethylacetate, valerate, palmitate, acrylate, oxalate, malonate, crotonate, succinate, citrate, methylene-bis-thioglycolate, ethylene-bis-iminoacetate, nitrilotriacetate, fumarate, maleate, benzoate, methylbenzoate, chlorobenzoate, dichlorobenzoate, hydroxybenzoate, aminobenzoate, phthalate, terephthalate, indolylacetate, chlorobenzenesulfonate, benzenesulfonate, toluenesulfonate, biphenyl-sulfonate and chlorotoluenesulfonate. Those of ordinary skill in the art are well aware of different counterions which can be used in place of those listed above.

In the structures of Formula (I)-(V), R$^1$, R$^2$, R$^3$, and R$^{15}$ are independently selected from the group consisting of hydrogen, alkyl, substituted alkyl, aryl, substituted aryl, alkaryl, substituted alkaryl, and R$^4$; wherein R$^4$ is a organic group composed of one or more organic monomers with said monomer molecular weights ranging from 28 to 500, preferably 43 to 350, even more preferably 43 to 250, wherein the organic group may be substituted with one or more additional leuco colorant moieties conforming to the structure of Formula I-V. In one aspect, R$^4$ is selected from the group consisting of alkyleneoxy (polyether), oxoalkyleneoxy (polyesters), oxoalkyleneamine (polyamides), epichlorohydrin, quaternized epichlorohydrin, alkyleneamine, hydroxyalkylene, acyloxyalkylene, carboxyalkylene, carboalkoxyalkylene, and sugar. In one aspect, R$^4$ is selected from EO, PO, BO, and mixtures thereof, more preferably from EO alone or from EO/PO mixtures. Where any leuco colorant comprises an R$^4$ group with three or more contiguous monomers, that leuco colorant is defined herein as a "polymeric leuco colorant". One skilled in the art knows that the properties of a compound with regard to any of a number of characteristic attributes such as solubility, partitioning, deposition, removal, staining, etc., are related to the placement, identity and number of such contiguous monomers incorporated therein. The skilled artisan can therefore adjust the placement, identity and number of such contiguous monomers to alter any particular attribute in a more or less predictable fashion.

Preferred leuco colorants include those conforming to the structure of Formula VI,

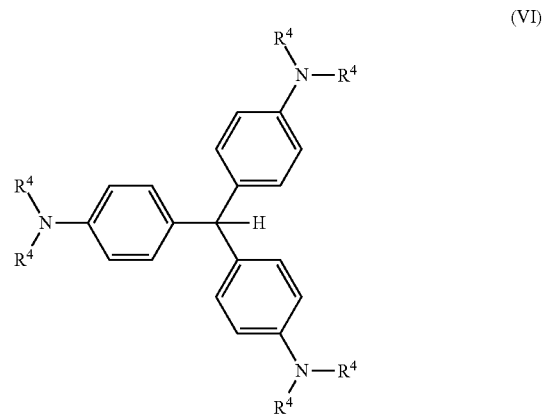

(VI)

wherein each R$^4$ is independently selected from the group consisting of H, methyl, ethyl, ((CH$_2$CH$_2$O)$_a$(C$_3$H$_6$O)$_b$)H, and mixtures thereof; preferably at least one R$^4$ group is ((CH$_2$CH$_2$O)$_a$(C$_3$H$_6$O)$_b$)H; wherein each index a is independently an integer from 1-100, each index b is independently an integer from 0-50, and wherein the sum of all the independently selected a integers in all R$^4$ groups is no more than 200, preferably no more than 100, and the sum of all the independently selected b integers in all R$^4$ groups is no more than 100, preferably no more than 50. Preferably at least two R$^4$ groups are selected from methyl and ethyl, most preferably at least one N in structure VI is substituted with two $R^4$ groups selected from methyl and ethyl, preferably methyl. Where non-depositing leuco colorants are desired, the sum of all the independently selected a integers in all $R^4$ groups is no less than 20, preferably no less than 30, 40 or even no less than 50, and the sum of all the independently selected b integers in all $R^4$ groups is no more than 20 or even no more than 10. In one aspect, a non-depositing leuco colorant may have the sum of all the independently selected b integers in all $R^4$ groups be zero.

Highly preferred leuco colorants include those conforming to the structure of Formula VII,

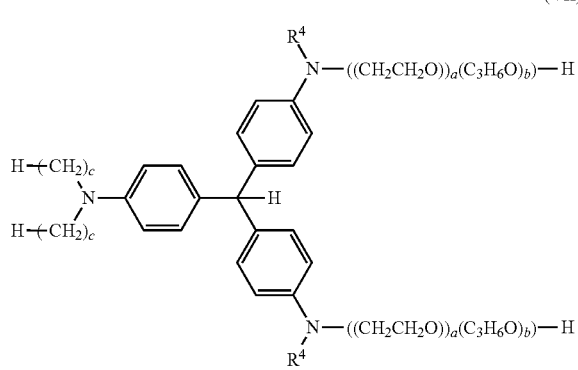

(VII)

wherein each index c is independently 0, 1 or 2, preferably each c is 1; each $R^4$ is independently selected from the group consisting of H, methyl, ethyl, $((CH_2CH_2O)_a(C_3H_6O)_b)H$, and mixtures thereof; preferably each $R^4$ is $((CH_2CH_2O)_a(C_3H_6O)_b)H$ wherein each index a is independently an integer from 1-50, more preferably 1-25, even more preferably 1-20, 1-15, 1-10, 1-5 or even 1-2; each index b is independently an integer from 0-25, more preferably 0-15, even more preferably 1-5 or even 1-3 and wherein the sum of all the independently selected a integers in the leuco colorant is no more than 100, more preferably no more than 80, most preferably no more than 60, 40, 20, 10 or even no more than 5, and the sum of all the independently selected b integers in the leuco colorant is no more than 50, more preferably no more than 40, most preferably no more than 30, 20, or even 10.

In one aspect, leuco colorants and/or substituted diarylamines of the instant invention have a Surface Tension Value of greater than 45 mN/m, more preferably greater than 47.5 mN/m, most preferably greater than 50 mN/m. In another aspect, the second colored state of the leuco colorant has a Surface Tension Value of greater than 45 mN/m, more preferably greater than 47.5 mN/m, most preferably greater than 50 mN/m. In yet another aspect of the invention both the leuco colorant and its corresponding second colored state have a Surface Tension Value of greater than 45 mN/m, more preferably greater than 47.5 mN/m, most preferably greater than 50 mN/m.

The leuco compounds described above are believed to be suitable for use in the treatment of textile materials, such as in domestic laundering processes. In particular, it is believed that the leuco compounds will deposit onto the fibers of the textile material due to the nature of the leuco compound. Further, once deposited onto the textile material, the leuco compound can be converted to a colored compound through the application of the appropriate chemical or physical triggers that will convert the leuco compound to its colored form. For example, the leuco compound can be converted to its colored form upon oxidation of the leuco compound to the oxidized compound. By selecting the proper leuco moiety, the leuco compound can be designed to impart a desired hue to the textile material as the leuco compound is converted to its colored form. For example, a leuco compound that exhibits a blue hue upon conversion to its colored form can be used to counteract the yellowing of the textile material that normally occurs due to the passage of time and/or repeated launderings. Thus, in other embodiments, the invention provides laundry care compositions comprising the above-described leuco compound and domestic methods for treating a textile material (e.g., methods for washing an article of laundry or clothing).

Preferably the leuco compound gives a hue to the cloth with a relative hue angle of 210 to 345, or even a relative hue angle of 240 to 320, or even a relative hue angle of 250 to 300 (e.g., 250 to 290). The relative hue angle can be determined by any suitable method as known in the art. However, preferably it may be determined as described in further detail herein with respect to deposition of the leuco entity on cotton relative to cotton absent any leuco entity.

In one preferred embodiment, the Hue Angle of the laundry care composition and the Relative Hue Angle delivered by the leuco colorant are different. Preferably, the Hue Angle of the laundry care composition and the Relative Hue Angle delivered by the leuco colorant, both of which are described in further detail herein, are at least 5, 10, 15, 20, 25, 30, 40, 50, 60, 70, 80, 90, 105, 120, 140 and 160 from one another.

In one embodiment, the present invention provides a laundry care composition including at least one laundry care ingredient, a leuco composition, and a stabilizing amount of an antioxidant composition which comprises at least one sterically hindered phenol and at least one substituted diarylamine, said antioxidant composition having a Color Formation Index, as determined according to the Method disclosed herein, of less than or equal to 75, preferably less than or equal to 50, more preferably less than or equal to 40, even more preferably less than or equal to 30, most preferably less than or equal to 20 or even 10.

The compositions of the present invention may optionally comprise a solvent system. The solvent system can utilize any material that help to form a stable mixture of the leuco composition and the antioxidant(s). Preferably, the solvent system contains non-hazardous components. In a preferred embodiment, the solvent system comprises at least one component selected from the group consisting of water, ethanol, ethylene glycol, propylene glycol, propylene carbonate, ethylene carbonate, polyalkyleneoxide, polyester, polycarbonate, polyaziridine, nonionic surfactants, and mixtures thereof. More preferably, the solvent system comprises a component selected from the group consisting of water, propylene glycol, polyethylene glycol, polypropylene glycol, copolymer of ethylene glycol and propylene glycol, nonionic surfactants, and mixtures thereof. In such embodiments, the polyethylene glycol, polypropylene glycol, and the copolymer of ethylene glycol and propylene glycol used in the solvent system can contain polymer chains that are capped with an end group selected from the groups consisting of alkoxy groups, alkylcarbonyloxy groups, aryloxy groups, primary amino groups, secondary amino groups, tertiary amino groups, quaternary ammonium groups, and saccharide groups. In one particularly preferred embodiment, the solvent system comprises a nonionic surfactant, such as the nonionic surfactants disclosed as laundry care ingredients later in this application.

Laundry Care Ingredients
Surfactant System

The products of the present invention may comprise from about 0.00 wt %, more typically from about 0.10 to 80% by weight of a surfactant. In one aspect, such compositions may comprise from about 5% to 50% by weight of surfactant. Surfactants utilized can be of the anionic, nonionic, amphoteric, ampholytic, zwitterionic, or cationic type or can comprise compatible mixtures of these types. Anionic and nonionic surfactants are typically employed if the fabric care product is a laundry detergent. On the other hand, cationic surfactants are typically employed if the fabric care product is a fabric softener.

Anionic Surfactant

Useful anionic surfactants can themselves be of several different types. For example, water-soluble salts of the higher fatty acids, i.e., "soaps", are useful anionic surfactants in the compositions herein. This includes alkali metal soaps such as the sodium, potassium, ammonium, and alkylolammonium salts of higher fatty acids containing from about 8 to about 24 carbon atoms, or even from about 12 to about 18 carbon atoms. Soaps can be made by direct saponification of fats and oils or by the neutralization of free fatty acids. Particularly useful are the sodium and potassium salts of the mixtures of fatty acids derived from coconut oil and tallow, i.e., sodium or potassium tallow and coconut soap.

Preferred alkyl sulphates are C8-18 alkyl alkoxylated sulphates, preferably a C12-15 alkyl or hydroxyalkyl alkoxylated sulphates. Preferably the alkoxylating group is an ethoxylating group. Typically the alkyl alkoxylated sulphate has an average degree of alkoxylation from 0.5 to 30 or 20, or from 0.5 to 10. The alkyl group may be branched or linear. The alkoxylated alkyl sulfate surfactant may be a mixture of alkoxylated alkyl sulfates, the mixture having an average (arithmetic mean) carbon chain length within the range of about 12 to about 30 carbon atoms, or an average carbon chain length of about 12 to about 15 carbon atoms, and an average (arithmetic mean) degree of alkoxylation of from about 1 mol to about 4 mols of ethylene oxide, propylene oxide, or mixtures thereof, or an average (arithmetic mean) degree of alkoxylation of about 1.8 mols of ethylene oxide, propylene oxide, or mixtures thereof. The alkoxylated alkyl sulfate surfactant may have a carbon chain length from about 10 carbon atoms to about 18 carbon atoms, and a degree of alkoxylation of from about 0.1 to about 6 mols of ethylene oxide, propylene oxide, or mixtures thereof. The alkoxylated alkyl sulfate may be alkoxylated with ethylene oxide, propylene oxide, or mixtures thereof. Alkyl ether sulfate surfactants may contain a peaked ethoxylate distribution. Specific example include C12-C15 EO 2.5 Sulfate, C14-C15 EO 2.5 Sulfate and C12-C15 EO 1.5 Sulfate derived from NEODOL® alcohols from Shell and C12-C14 EO3 Sulfate, C12-C16 EO3 Sulfate, C12-C14 EO2 Sulfate and C12-C14 EO1 Sulfate derived from natural alcohols from Huntsman. The AES may be linear, branched, or combinations thereof. The alkyl group may be derived from synthetic or natural alcohols such as those supplied by the tradename Neodol® by Shell, Safol®, Lial®, and Isalchem® by Sasol or midcut alcohols derived from vegetable oils such as coconut and palm kernel. Another suitable anionic detersive surfactant is alkyl ether carboxylate, comprising a C10-C26 linear or branched, preferably C10-C20 linear, most preferably C16-C18 linear alkyl alcohol and from 2 to 20, preferably 7 to 13, more preferably 8 to 12, most preferably 9.5 to 10.5 ethoxylates. The acid form or salt form, such as sodium or ammonium salt, may be used, and the alkyl chain may contain one cis or trans double bond. Alkyl ether carboxylic acids are available from Kao (Akypo®), Huntsman (Empicol®) and Clariant (Emulsogen®).

Other useful anionic surfactants can include the alkali metal salts of alkyl benzene sulfonates, in which the alkyl group contains from about 9 to about 15 carbon atoms, in straight chain (linear) or branched chain configuration. In some examples, the alkyl group is linear. Such linear alkylbenzene sulfonates are known as "LAS." In other examples, the linear alkylbenzene sulfonate may have an average number of carbon atoms in the alkyl group of from about 11 to 14.

In a specific example, the linear straight chain alkylbenzene sulfonates may have an average number of carbon atoms in the alkyl group of about 11.8 carbon atoms, which may be abbreviated as C11.8 LAS. Preferred sulphonates are C10-13 alkyl benzene sulphonate. Suitable alkyl benzene sulphonate (LAS) may be obtained, by sulphonating commercially available linear alkyl benzene (LAB); suitable LAB includes low 2-phenyl LAB, such as those supplied by Sasol under the tradename Isochem® or those supplied by Petresa under the tradename Petrelab®, other suitable LAB include high 2-phenyl LAB, such as those supplied by Sasol under the tradename Hyblene®. A suitable anionic detersive surfactant is alkyl benzene sulphonate that is obtained by DETAL catalyzed process, although other synthesis routes, such as HF, may also be suitable. In one aspect a magnesium salt of LAS is used. Suitable anionic sulfonate surfactants for use herein include water-soluble salts of C8-C18 alkyl or hydroxyalkyl sulfonates; C11-C18 alkyl benzene sulfonates (LAS), modified alkylbenzene sulfonate (MLAS) as discussed in WO 99/05243, WO 99/05242, WO 99/05244, WO 99/05082, WO 99/05084, WO 99/05241, WO 99/07656, WO 00/23549, and WO 00/23548; methyl ester sulfonate (MES); and alpha-olefin sulfonate (AOS). Those also include the paraffin sulfonates may be monosulfonates and/or disulfonates, obtained by sulfonating paraffins of 10 to 20 carbon atoms. The sulfonate surfactant may also include the alkyl glyceryl sulfonate surfactants.

Anionic surfactants of the present invention may exist in an acid form, and said acid form may be neutralized to form a surfactant salt which is desirable for use in the present detergent compositions. Typical agents for neutralization include the metal counterion base such as hydroxides, e.g., NaOH or KOH. Further preferred agents for neutralizing anionic surfactants of the present invention and adjunct anionic surfactants or cosurfactants in their acid forms include ammonia, amines, or alkanolamines. Alkanolamines are preferred. Suitable non-limiting examples including monoethanolamine, diethanolamine, triethanolamine, and other linear or branched alkanolamines known in the art; for example, highly preferred alkanolamines include 2-amino-1-propanol, 1-aminopropanol, monoisopropanolamine, or 1-amino-3-propanol.

Nonionic Surfactant

Preferably the composition comprises a nonionic detersive surfactant. Suitable nonionic surfactants include alkoxylated fatty alcohols. The nonionic surfactant may be selected from ethoxylated alcohols and ethoxylated alkyl phenols of the formula $R(OC_2H_4)_nOH$, wherein R is selected from the group consisting of aliphatic hydrocarbon radicals containing from about 8 to about 15 carbon atoms and alkyl phenyl radicals in which the alkyl groups contain from about 8 to about 12 carbon atoms, and the average value of n is from about 5 to about 15. Other non-limiting examples of nonionic surfactants useful herein include:

C8-C18 alkyl ethoxylates, such as, NEODOL® nonionic surfactants from Shell; $C_6$-$C_{12}$ alkyl phenol alkoxylates where the alkoxylate units may be ethyleneoxy units, propyleneoxy units, or a mixture thereof; C12-C18 alcohol and C6-C12 alkyl phenol condensates with ethylene oxide/propylene oxide block polymers such as Pluronic® from BASF; C14-C22 mid-chain branched alcohols, BA; C14-C22 mid-chain branched alkyl alkoxylates, $BAE_x$, wherein x is from 1 to 30; alkylpolysaccharides; specifically alkylpolyglycosides; polyhydroxy fatty acid amides; and ether capped poly(oxyalkylated) alcohol surfactants. Specific example include C12-C15 EO7 and C14-C15 EO7 NEODOL® nonionic surfactants from Shell, C12-C14 EO7 and C12-C14 EO9 Surfonic® nonionic surfactants from Huntsman.

Highly preferred nonionic surfactants are the condensation products of Guerbet alcohols with from 2 to 18 moles, preferably 2 to 15, more preferably 5-9 of ethylene oxide per mole of alcohol. Suitable nonionic surfactants include those with the trade name Lutensol® from BASF. Lutensol XP-50 is a Guerbet ethoxylate that contains an average of about 5 ethoxy groups. Lutensol XP-80 and containing an average of about 8 ethoxy groups. Other suitable non-ionic surfactants for use herein include fatty alcohol polyglycol ethers, alkylpolyglucosides and fatty acid glucamides, alkylpolyglucosides based on Guerbet alcohols.

Amphoteric Surfactant

The surfactant system may include amphoteric surfactant, such as amine oxide. Preferred amine oxides are alkyl dimethyl amine oxide or alkyl amido propyl dimethyl amine oxide, more preferably alkyl dimethyl amine oxide and especially coco dimethyl amino oxide. Amine oxide may have a linear or mid-branched alkyl moiety.

Ampholytic Surfactants

The surfactant system may comprise an ampholytic surfactant. Specific, non-limiting examples of ampholytic surfactants include: aliphatic derivatives of secondary or tertiary amines, or aliphatic derivatives of heterocyclic secondary and tertiary amines in which the aliphatic radical can be straight- or branched-chain. One of the aliphatic substituents may contain at least about 8 carbon atoms, for example from about 8 to about 18 carbon atoms, and at least one contains an anionic water-solubilizing group, e.g. carboxy, sulfonate, sulfate. See U.S. Pat. No. 3,929,678 at column 19, lines 18-35, for suitable examples of ampholytic surfactants.

Zwitterionic Surfactant

Zwitterionic surfactants are known in the art, and generally include surfactants which are neutrally charged overall, but carry at least one positive charged atom/group and at least one negatively charged atom/group. Examples of zwitterionic surfactants include: derivatives of secondary and tertiary amines, derivatives of heterocyclic secondary and tertiary amines, or derivatives of quaternary ammonium, quaternary phosphonium or tertiary sulfonium compounds. See U.S. Pat. No. 3,929,678 at column 19, line 38 through column 22, line 48, for examples of zwitterionic surfactants; betaines, including alkyl dimethyl betaine and cocodimethyl amidopropyl betaine, $C_8$ to $C_{18}$ (for example from $C_{12}$ to $C_{18}$) amine oxides and sulfo and hydroxy betaines, such as N-alkyl-N,N-dimethylammino-1-propane sulfonate where the alkyl group can be $C_8$ to $C_{18}$ and in certain embodiments from $C_{10}$ to $C_{14}$. A preferred zwitterionic surfactant for use in the present invention is the cocoamidopropyl betaine.

Cationic Surfactants

Examples of cationic surfactants include quaternary ammonium surfactants, which can have up to 26 carbon atoms specific. Additional examples include a) alkoxylate quaternary ammonium (AQA) surfactants as discussed in U.S. Pat. No. 6,136,769; b) dimethyl hydroxyethyl quaternary ammonium as discussed in U.S. Pat. No. 6,004,922; c) polyamine cationic surfactants as discussed in WO 98/35002, WO 98/35003, WO 98/35004, WO 98/35005, and WO 98/35006, which is herein incorporated by reference; d) cationic ester surfactants as discussed in U.S. Pat. Nos. 4,228,042, 4,239,660 4,260,529 and U.S. Pat. No. 6,022,844, which is herein incorporated by reference; and e) amino surfactants as discussed in U.S. Pat. No. 6,221,825 and WO 00/47708, which is herein incorporated by reference, and specifically amido propyldimethyl amine (APA). Useful cationic surfactants also include those described in U.S. Pat. No. 4,222,905, Cockrell, issued Sep. 16, 1980, and in U.S. Pat. No. 4,239,659, Murphy, issued Dec. 16, 1980, both of which are also incorporated herein by reference. Quaternary ammonium compounds may be present in fabric enhancer compositions, such as fabric softeners, and comprise quaternary ammonium cations that are positively charged polyatomic ions of the structure $NR_4^+$, where R is an alkyl group or an aryl group.

The fabric care compositions of the present invention may contain up to about 30%, alternatively from about 0.01% to about 20%, more alternatively from about 0.1% to about 20%, by weight of the composition, of a cationic surfactant. For the purposes of the present invention, cationic surfactants include those which can deliver fabric care benefits. Non-limiting examples of useful cationic surfactants include: fatty amines, imidazoline quat materials and quaternary ammonium surfactants, preferably N, N-bis (stearoyl-oxy-ethyl) N,N-dimethyl ammonium chloride, N,N-bis(tallowoyl-oxy-ethyl) N,N-dimethyl ammonium chloride, N,N-bis(stearoyl-oxy-ethyl)N-(2 hydroxyethyl) N-methyl ammonium methylsulfate; 1, 2 di (stearoyl-oxy) 3 trimethyl ammoniumpropane chloride; dialkylenedimethylammonium salts such as dicanoladimethylammonium chloride, di(hard)tallowdimethylammonium chloride dicanoladimethylammonium methylsulfate; 1-methyl-1-stearoylamidoethyl-2-stearoylimidazolinium methylsulfate; 1-tallowylamidoethyl-2-tallowylimidazoline; N,N"-dialkyldiethylenetriamine; the reaction product of N-(2-hydroxyethyl)-1,2-ethylenediamine or N-(2-hydroxyisopropyl)-1,2-ethylenediamine with glycolic acid, esterified with fatty acid, where the fatty acid is (hydrogenated) tallow fatty acid, palm fatty acid, hydrogenated palm fatty acid, oleic acid, rapeseed fatty acid, hydrogenated rapeseed fatty acid; polyglycerol esters (PGEs), oily sugar derivatives, and wax emulsions and a mixture of the above.

It will be understood that combinations of softener actives disclosed above are suitable for use herein.

Adjunct Cleaning Additives

The laundry care compositions of the invention may also contain adjunct cleaning additives. The precise nature of the cleaning adjunct additives and levels of incorporation thereof will depend on the physical form of the laundry care composition, and the precise nature of the cleaning operation for which it is to be used.

The adjunct cleaning additives may be selected from the group consisting of builders, structurants or thickeners, clay soil removal/anti-redeposition agents, polymeric soil release agents, polymeric dispersing agents, polymeric grease cleaning agents, enzymes, enzyme stabilizing systems, bleaching compounds, bleaching agents, bleach activators, bleach catalysts, brighteners, dyes, hueing agents, dye transfer inhibiting agents, chelating agents, suds supressors, softeners, and perfumes. This listing of adjunct cleaning additives is exemplary only, and not by way of limitation of the types of adjunct cleaning additives which can be used. In principle, any adjunct cleaning additive known in the art may be used in the instant invention.

Polymers

The composition may comprise one or more polymers. Non-limiting examples, all of which may be optionally modified, include polyethyleneimines, carboxymethylcellulose, poly(vinyl-pyrrolidone), poly (ethylene glycol), poly (vinyl alcohol), poly(vinylpyridine-N-oxide), poly(vinylimidazole), polycarboxylates or alkoxylated substituted phenols (ASP). as described in WO 2016/041676. An example of ASP dispersants, include but are not limited to, HOSTAPAL BV CONC S1000 available from Clariant.

Polyamines may be used for grease, particulate removal or stain removal. A wide variety of amines and polyakyleneimines can be alkoxylated to various degrees to achieve hydrophobic or hydrophilic cleaning. Such compounds may include, but are not limited to, ethoxylated polyethyleneimine, ethoxylated hexamethylene diamine, and sulfated versions thereof. Useful examples of such polymers are HP20 available from BASF or a polymer having the following general structure:

bis(($C_2H_5O$) ($C_2H_4O)_n$)($CH_3$)—N+—$C_xH_{2x}$—N+—($CH_3$)-bis(($C_2HO$)($C_2H_4O)_n$), wherein n=from 20 to 30, and x=from 3 to 8, or sulphated or sulphonated variants thereof. Polypropoxylated-polyethoxylated amphiphilic polyethyleneimine derivatives may also be included to achieve greater grease removal and emulsification. These may comprise alkoxylated polyalkylenimines, preferably having an inner polyethylene oxide block and an outer polypropylene oxide block. Detergent compositions may also contain unmodified polyethyleneimines useful for enhanced beverage stain removal. PEI's of various molecular weights are commercially available from the BASF Corporation under the trade name Lupasol® Examples of suitable PEI's include, but are not limited to, Lupasol FG®, Lupasol G-35®.

The composition may comprise one or more carboxylate polymers, such as a maleate/acrylate random copolymer or polyacrylate homopolymer useful as polymeric dispersing agents. Alkoxylated polycarboxylates such as those prepared from polyacrylates are also useful to provide clay dispersancy. Such materials are described in WO 91/08281. Chemically, these materials comprise polyacrylates having one ethoxy side-chain per every 7-8 acrylate units. The side-chains are of the formula —$(CH_2CH_2O)_m(CH_2)_nCH_3$ wherein m is 2-3 and n is 6-12. The side-chains are ester or ether-linked to the polyacrylate "backbone" to provide a "comb" polymer type structure.

Preferred amphiphilic graft co-polymer(s) comprise (i) polyethyelene glycol backbone; and (ii) at least one pendant moiety selected from polyvinyl acetate, polyvinyl alcohol and mixtures thereof. An example of an amphiphilic graft co-polymer is Sokalan HP22, supplied from BASF.

Alkoxylated substituted phenols as described in WO 2016/041676 are also suitable examples of polymers that provide clay dispersancy. Hostapal BV Conc S1000, available from Clariant, is one non-limiting example of an ASP dispersant.

Preferably the composition comprises one or more soil release polymers. Suitable soil release polymers are polyester soil release polymers such as Repel-o-tex polymers, including Repel-o-tex SF, SF-2 and SRP6 supplied by Rhodia. Other suitable soil release polymers include Texcare polymers, including Texcare SRA100, SRA300, SRN100, SRN170, SRN240, SRN260 SRN300 and SRN325 supplied by Clariant. Other suitable soil release polymers are Marloquest polymers, such as Marloquest SL, HSCB, L235M, B, G82 supplied by Sasol. Other suitable soil release polymers include methyl-capped ethoxylated propoxylated soil release polymers as described in U.S. Pat. No. 9,365,806.

Preferably the composition comprises one or more polysaccharides which may in particular be chosen from carboxymethyl cellulose, methylcarboxymethylcellulose, sulfoethylcellulose, methylhydroxyethylcellulose, carboxymethyl xyloglucan, carboxymethyl xylan, sulfoethylgalactomannan, carboxymethyl galactomannan, hydoxyethyl galactomannan, sulfoethyl starch, carboxymethyl starch, and mixture thereof. Other polysaccharides suitable for use in the present invention are the glucans. Preferred glucans are Poly alpha-1,3-glucan which is a polymer comprising glucose monomeric units linked together by glycosidic linkages (i.e., glucosidic linkages), wherein at least about 50% of the glycosidic linkages are alpha-1,3-glycosidic linkages. Poly alpha-1,3-glucan is a type of polysaccharide. Poly alpha-1,3-glucan can be enzymatically produced from sucrose using one or more glucosyltransferase enzymes, such as described in U.S. Pat. No. 7,000,000, and U.S. Patent Appl. Publ. Nos. 2013/0244288 and 2013/0244287 (all of which are incorporated herein by reference), for example.

Other suitable polysaccharides for use in the composition are cationic polysaccharides. Examples of cationic polysaccharides include cationic guar gum derivatives, quaternary nitrogen-containing cellulose ethers, and synthetic polymers that are copolymers of etherified cellulose, guar and starch. When used, the cationic polymers herein are either soluble in the composition or are soluble in a complex coacervate phase in the composition formed by the cationic polymer and the anionic, amphoteric and/or zwitterionic surfactant component described hereinbefore. Suitable cationic polymers are described in U.S. Pat. Nos. 3,962,418; 3,958,581; and U.S. Publication No. 2007/0207109A1.

Polymers can also function as deposition aids for other detergent raw materials. Preferred deposition aids are selected from the group consisting of cationic and nonionic polymers. Suitable polymers include cationic starches, cationic hydroxyethylcellulose, polyvinylformaldehyde, locust bean gum, mannans, xyloglucans, tamarind gum, polyethyleneterephthalate and polymers containing dimethylaminoethyl methacrylate, optionally with one or more monomers selected from the group comprising acrylic acid and acrylamide.

Additional Amines

Polyamines are known to improve grease removal. Preferred cyclic and linear amines for performance are 1,3-bis (methylamine)-cyclohexane, 4-methylcyclohexane-1,3-diamine (Baxxodur ECX 210 supplied by BASF) 1,3 propane diamine, 1,6 hexane diamine,1,3 pentane diamine (Dytek EP supplied by Invista), 2-methyl 1,5 pentane diamine (Dytek A supplied by Invista). U.S. Pat. No. 6,710,023 discloses hand dishwashing compositions containing said diamines and polyamines containing at least 3 protonable amines. Polyamines according to the invention have at least one pka above the wash pH and at least two pka's greater than about 6 and below the wash pH. Preferred polyamines with are selected from the group consisting of tetraethylenepentamine, hexaethylhexamine, heptaethylheptamines, octaethyloctamines, nonethylnonamines, and mixtures thereof commercially available from Dow, BASF and Huntman. Especially preferred polyetheramines are lipophilic modified as described in U.S. Pat. Nos. 9,752,101, 9,487,739, 9,631,163

Dye Transfer Inhibitor (DTI)

The composition may comprise one or more dye transfer inhibiting agents. In one embodiment of the invention the inventors have surprisingly found that compositions comprising polymeric dye transfer inhibiting agents in addition to the specified dye give improved performance. This is surprising because these polymers prevent dye deposition. Suitable dye transfer inhibitors include, but are not limited to, polyvinylpyrrolidone polymers, polyamine N-oxide polymers, copolymers of N-vinylpyrrolidone and N-vinylimidazole, polyvinyloxazolidones and polyvinylimidazoles or mixtures thereof. Suitable examples include PVP-K15, PVP-K30, ChromaBond S-400, ChromaBond S-403E and Chromabond S-100 from Ashland Aqualon, and Sokalan HP165, Sokalan HP50, Sokalan HP53, Sokalan HP59, Sokalan® HP 56K, Sokalan® HP 66 from BASF. Other suitable DTIs are as described in WO2012/004134. When present in a subject composition, the dye transfer inhibiting agents may be present at levels from about 0.0001% to about 10%, from about 0.01% to about 5% or even from about 0.1% to about 3% by weight of the composition.

Enzymes

Enzymes may be included in the laundry care compositions for a variety of purposes, including removal of protein-based, carbohydrate-based, or triglyceride-based stains from substrates, for the prevention of refugee dye transfer in fabric laundering, and for fabric restoration. Suitable enzymes include proteases, amylases, lipases, carbohydrases, cellulases, oxidases, peroxidases, mannanases, and mixtures thereof of any suitable origin, such as vegetable, animal, bacterial, fungal, and yeast origin. Other enzymes that may be used in the laundry care compositions described herein include hemicellulases, peroxidases, proteases, cellulases, endoglucanases, xylanases, lipases, phospholipases, amylases, gluco-amylases, xylanases, esterases, cutinases, pectinases, keratanases, reductases, oxidases, phenoloxidases, lipoxygenases, ligninases, pullulanases, tannases, pentosanases, malanases, β-glucanases, arabinosidases, hyaluronidases, chondroitinases, laccases, or mixtures thereof, esterases, mannanases, pectate lyases, and or mixtures thereof. Other suitable enzymes include Nuclease enzyme. The composition may comprise a nuclease enzyme. The nuclease enzyme is an enzyme capable of cleaving the phosphodiester bonds between the nucleotide sub-units of nucleic acids. The nuclease enzyme herein is preferably a deoxyribonuclease or ribonuclease enzyme or a functional fragment thereof. Enzyme selection is influenced by factors such as pH-activity and/or stability optima, thermostability, and stability to active detergents, builders, and the like.

The enzymes may be incorporated into the laundry care composition at levels from 0.0001% to 5% of active enzyme by weight of the laundry care composition. The enzymes can be added as a separate single ingredient or as mixtures of two or more enzymes.

In some embodiments, lipase may be used. Lipase may be purchased under the trade name Lipex from Novozymes (Denmark). Amylases (Natalase®, Stainzyme®, Stainzyme Plus®) may be supplied by Novozymes, Bagsvaerd, Denmark. Proteases may be supplied by Genencor International, Palo Alto, Calif., USA (e.g. Purafect Prime®) or by Novozymes, Bagsvaerd, Denmark (e.g. Liquanase®, Coronase®, Savinase®). Other preferred enzymes include pectate lyases preferably those sold under the trade names Pectawash®, Xpect®, Pectaway® and the mannanases sold under the trade names Mannaway® (all from Novozymes A/S, Bagsvaerd, Denmark), and Purabrite® (Genencor International Inc., Palo Alto, Calif.). A range of enzyme materials and means for their incorporation into synthetic laundry care compositions is disclosed in WO 9307263 A; WO 9307260 A; WO 8908694 A; U.S. Pat. Nos. 3,553,139; 4,101,457; and 4,507,219. Enzyme materials useful for liquid laundry care compositions, and their incorporation into such compositions, are disclosed in U.S. Pat. No. 4,261,868.

Enzyme Stabilizing System

The enzyme-containing compositions described herein may optionally comprise from about 0.001% to about 10%, in some examples from about 0.005% to about 8%, and in other examples, from about 0.01% to about 6%, by weight of the composition, of an enzyme stabilizing system. The enzyme stabilizing system can be any stabilizing system which is compatible with the detersive enzyme. Such a system may be inherently provided by other formulation actives, or be added separately, e.g., by the formulator or by a manufacturer of detergent-ready enzymes. Such stabilizing systems can, for example, comprise calcium ion, boric acid, propylene glycol, short chain carboxylic acids, boronic acids, chlorine bleach scavengers and mixtures thereof, and are designed to address different stabilization problems depending on the type and physical form of the laundry care composition. See U.S. Pat. No. 4,537,706 for a review of borate stabilizers.

Chelating Agent.

Preferably the composition comprises chelating agents and/or crystal growth inhibitor. Suitable molecules include copper, iron and/or manganese chelating agents and mixtures thereof. Suitable molecules include aminocarboxylates, aminophosphonates, succinates, salts thereof, and mixtures thereof. Non-limiting examples of suitable chelants for use herein include ethylenediaminetetracetates, N-(hydroxyethyl)-ethylene-diamine-triacetates, nitrilotriacetates, ethylenediamine tetraproprionates, triethylenetetramine, triethylene-tetraamine-hexacetates, diethylenetriamine, diethylenetriamine-pentaacetates, ethanoldiglycines, ethylenediaminetetrakis (methylenephosphonates), diethylenetriamine penta(methylene phosphonic acid) (DTPMP), ethylenediamine disuccinate (EDDS), hydroxyethanedimethylenephosphonic acid (HEDP), methylglycinediacetic acid (MGDA), diethylenetriaminepentaacetic acid (DTPA), and 1,2-diydroxybenzene-3,5-disulfonic acid (Tiron), salts thereof, and mixtures thereof. Tiron as well as other sulphonated catechols may also be used as effective heavy metal chelants. Other non-limiting examples of chelants of use in the present invention are found in U.S. Pat. Nos. 7,445,644, 7,585,376 and 2009/0176684A1. Other suitable chelating agents for use herein are the commercial DEQUEST series, and chelants from Monsanto, DuPont, and Nalco Inc.

Brighteners

Optical brighteners or other brightening or whitening agents may be incorporated at levels of from about 0.01% to about 1.2%, by weight of the composition, into the laundry care compositions described herein. Commercial optical brighteners, which may be used herein, can be classified into subgroups, which include, but are not necessarily limited to, derivatives of stilbene, pyrazoline, coumarin, carboxylic acid, methinecyanines, dibenzothiphene-5,5-dioxide, azoles, 5- and 6-membered-ring heterocycles, and other miscellaneous agents. Examples of such brighteners are disclosed in "The Production and Application of Fluorescent Brightening Agents," M. Zahradnik, John Wiley & Sons, New York (1982). Specific, non-limiting examples of optical brighteners which may be useful in the present compositions are those identified in U.S. Pat. Nos. 4,790,856 and 3,646, 015. Highly preferred Brighteners include Disodium 4,4'- bis{[4-anilino-6-[bis(2-hydroxyethyl)amino-s-triazin-2-yl]-amino}-2,2'-stilbenedisulfonate, 4,4'-bis{[4-anilino-6-morpholino-s-triazin-2-yl]-amino}-2,2'-stilbenedisulfonate, Disodium 4,4"-bis[(4,6-di-anilino-s-triazin-2-yl)-amino]-2, 2'-stilbenedisulfonate and disodium 4,4'-bis-(2-sulfostyryl) biphenyl.

Bleaching Agents.

It may be preferred for the composition to comprise one or more bleaching agents. Suitable bleaching agents include photobleaches, hydrogen peroxide, sources of hydrogen peroxide, pre-formed peracids and mixtures thereof.

(1) photobleaches for example sulfonated zinc phthalocyanine sulfonated aluminium phthalocyanines, xanthene dyes and mixtures thereof;

(2) pre-formed peracids: Suitable preformed peracids include, but are not limited to compounds selected from the group consisting of pre-formed peroxyacids or salts thereof typically a percarboxylic acids and salts, percarbonic acids and salts, perimidic acids and salts, peroxymonosulfuric acids and salts, for example, Oxone®, and mixtures thereof. Suitable examples include peroxycarboxylic acids or salts thereof, or peroxysulphonic acids or salts thereof. Particularly preferred peroxyacids are phthalimido-peroxy-alkanoic acids, in particular ε-phthalimido peroxy hexanoic acid (PAP). Preferably, the peroxyacid or salt thereof has a melting point in the range of from 30° C. to 60° C.

(3) sources of hydrogen peroxide, for example, inorganic perhydrate salts, including alkali metal salts such as sodium salts of perborate (usually mono- or tetra-hydrate), percarbonate, persulphate, perphosphate, persilicate salts and mixtures thereof.

Fabric Shading Dyes

The fabric shading dye (sometimes referred to as hueing, bluing or whitening agents) typically provides a blue or violet shade to fabric. Such dye(s) are well known in the art and may be used either alone or in combination to create a specific shade of hueing and/or to shade different fabric types. The fabric shading dye may be selected from any chemical class of dye as known in the art, including but not limited to acridine, anthraquinone (including polycyclic quinones), azine, azo (e.g., monoazo, disazo, trisazo, tetrakisazo, polyazo), benzodifurane, benzodifuranone, carotenoid, coumarin, cyanine, diazahemicyanine, diphenylmethane, formazan, hemicyanine, indigoids, methane, naphthalimides, naphthoquinone, nitro, nitroso, oxazine, phthalocyanine, pyrazoles, stilbene, styryl, triarylmethane, triphenylmethane, xanthenes and mixtures thereof. The amount of adjunct fabric shading dye present in a laundry care composition of the invention is typically from 0.0001 to 0.05 wt % based on the total laundry care composition, preferably from 0.0001 to 0.005 wt %. Based on the wash liquor, the concentration of fabric shading dye typically is from 1 ppb to 5 ppm, preferably from 10 ppb to 500 ppb.

Suitable fabric shading dyes include small molecule dyes, polymeric dyes and dye-clay conjugates. Preferred fabric shading dyes are selected from small molecule dyes and polymeric dyes. Suitable small molecule dyes may be selected from the group consisting of dyes falling into the Colour Index (C.I., Society of Dyers and Colourists, Bradford, UK) classifications of Acid, Direct, Basic, Reactive, Solvent or Disperse dyes.

Suitable polymeric dyes include dyes selected from the group consisting of polymers containing covalently bound (sometimes referred to as conjugated) chromogens, (also known as dye-polymer conjugates), for example polymers with chromogen monomers co-polymerized into the backbone of the polymer and mixtures thereof. Preferred polymeric dyes comprise the optionally substituted alkoxylated dyes, such as alkoxylated triphenyl-methane polymeric colourants, alkoxylated carbocyclic and alkoxylated heterocyclic azo colourants including alkoxylated thiophene polymeric colourants, and mixtures thereof, such as the fabric-substantive colorants sold under the name of Liquitint® (Milliken, Spartanburg, S.C., USA).

Suitable dye clay conjugates include dye clay conjugates selected from the group comprising at least one cationic/basic dye and a smectite clay; a preferred clay may be selected from the group consisting of Montmorillonite clay, Hectorite clay, Saponite clay and mixtures thereof.

Pigments are well known in the art and may also be used in the laundry care compositions herein. Suitable pigments include C.I Pigment Blues 15 to 20, especially 15 and/or 16, C.I. Pigment Blue 29, C.I. Pigment Violet 15, Monastral Blue and mixtures thereof.

Builders

The laundry care compositions of the present invention may optionally comprise a builder. Builders selected from aluminosilicates and silicates assist in controlling mineral hardness in wash water, or to assist in the removal of particulate soils from surfaces. Suitable builders may be selected from the group consisting of phosphates polyphosphates, especially sodium salts thereof; carbonates, bicarbonates, sesquicarbonates, and carbonate minerals other than sodium carbonate or sesquicarbonate; organic mono-, di-, tri-, and tetracarboxylates, especially water-soluble non-surfactant carboxylates in acid, sodium, potassium or alkanolammonium salt form, as well as oligomeric or water-soluble low molecular weight polymer carboxylates including aliphatic and aromatic types; and phytic acid. These may be complemented by borates, e.g., for pH-buffering purposes, or by sulfates, especially sodium sulfate and any other fillers or carriers which may be important to the engineering of stable surfactant and/or builder-containing laundry care compositions.

pH Buffer System

The compositions may also include a pH buffer system. The laundry care compositions herein may be formulated such that, during use in aqueous cleaning operations, the wash water will have a pH of between about 6.0 and about 12, and in some examples, between about 7.0 and 11. Techniques for controlling pH at recommended usage levels include the use of buffers, alkalis, or acids, and are well known to those skilled in the art. These include, but are not limited to, the use of sodium carbonate, citric acid or sodium citrate, monoethanol amine or other amines, boric acid or borates, and other pH-adjusting compounds well known in the art. The laundry care compositions herein may comprise dynamic in-wash pH profiles by delaying the release of citric acid.

Structurant/Thickeners

Structured liquids can either be internally structured, whereby the structure is formed by primary ingredients (e.g. surfactant material) and/or externally structured by providing a three dimensional matrix structure using secondary ingredients (e.g. polymers, clay and/or silicate material). The composition may comprise from about 0.01% to about 5%, by weight of the composition, of a structurant, and in some examples, from about 0.1% to about 2.0%, by weight of the composition, of a structurant. The structurant may be selected from the group consisting of diglycerides and triglycerides, ethylene glycol distearate, microcrystalline cellulose, cellulose-based materials, microfiber cellulose, biopolymers, xanthan gum, gellan gum, and mixtures thereof. In some examples, a suitable structurant includes hydrogenated castor oil, and non-ethoxylated derivatives thereof. Other suitable structurants are disclosed in U.S. Pat. No. 6,855,680. Such structurants have a thread-like structuring system having a range of aspect ratios. Further suitable structurants and the processes for making them are described in WO 2010/034736.

Suds Suppressors

Compounds for reducing or suppressing the formation of suds can be incorporated into the laundry care compositions described herein. Suds suppression can be of particular importance in the so-called "high concentration cleaning process" as described in U.S. Pat. Nos. 4,489,455, 4,489,574, and in front-loading style washing machines.

A wide variety of materials may be used as suds suppressors, and suds suppressors are well known to those skilled in the art. See, for example, Kirk Othmer Encyclopedia of Chemical Technology, Third Edition, Volume 7, pages 430-447 (John Wiley & Sons, Inc., 1979). Examples of suds suppressors include monocarboxylic fatty acid, and soluble salts therein, high molecular weight hydrocarbons such as paraffin, fatty acid esters (e.g., fatty acid triglycerides), fatty acid esters of monovalent alcohols, aliphatic C18-C40 ketones (e.g., stearone), N-alkylated amino triazines, waxy hydrocarbons preferably having a melting point below about 100° C., silicone suds suppressors, and secondary alcohols. Suds suppressors are described in U.S. Pat. Nos. 2,954,347; 4,075,118; 4,265,779; 4,265,779; 3,455,839; 3,933,672; 4,652,392; 4,978,471; 4,983,316; 5,288,431; 4,639,489; 4,749,740; and 4,798,679.

The laundry care compositions herein may comprise from 0% to about 10%, by weight of the composition, of suds suppressor. When utilized as suds suppressors, monocarboxylic fatty acids, and salts thereof, may be present in amounts up to about 5% by weight of the laundry care composition, and in some examples, may be from about 0.5% to about 3% by weight of the laundry care composition. Silicone suds suppressors may be utilized in amounts up to about 2.0% by weight of the laundry care composition, although higher amounts may be used. Monostearyl phosphate suds suppressors may be utilized in amounts ranging from about 0.1% to about 2% by weight of the laundry care composition. Hydrocarbon suds suppressors may be utilized in amounts ranging from about 0.01% to about 5.0% by weight of the laundry care composition, although higher levels can be used. Alcohol suds suppressors may be used at about 0.2% to about 3% by weight of the laundry care composition.

Suds Boosters

If high sudsing is desired, suds boosters such as the C10-C16 alkanolamides may be incorporated into the laundry care compositions from about 1% to about 10% by weight of the laundry care composition. Some examples include the C10-C14 monoethanol and diethanol amides. If desired, water-soluble magnesium and/or calcium salts such as $MgCl_2$, $MgSO_4$, $CaCl_2$, $CaSO_4$, and the like, may be added at levels of about 0.1% to about 2% by weight of the laundry care composition, to provide additional suds and to enhance grease removal performance.

Fillers and Carriers

Fillers and carriers may be used in the laundry care compositions described herein. As used herein, the terms "filler" and "carrier" have the same meaning and can be used interchangeably. Liquid laundry care compositions, and other forms of laundry care compositions that include a liquid component (such as liquid-containing unit dose laundry care compositions), may contain water and other solvents as fillers or carriers. Low molecular weight primary or secondary alcohols exemplified by methanol, ethanol, propanol, isopropanol, and phenoxyethanol are suitable. Monohydric alcohols may be used in some examples for solubilizing surfactants, and polyols such as those containing from 2 to about 6 carbon atoms and from 2 to about 6 hydroxy groups (e.g., 1,2-propanediol, 1,3-propanediol, 2,3-butanediol, ethylene glycol, and glycerine may be used). Amine-containing solvents may also be used.

Methods of Use

The present invention includes methods for whitening fabric. Compact fluid detergent compositions that are suitable for sale to consumers are suited for use in laundry pretreatment applications, laundry cleaning applications, and home care applications. Such methods include, but are not limited to, the steps of contacting detergent compositions in neat form or diluted in wash liquor, with at least a portion of a fabric which may or may not be soiled and then optionally rinsing the fabric. The fabric material may be subjected to a washing step prior to the optional rinsing step. Machine laundry methods may comprise treating soiled laundry with an aqueous wash solution in a washing machine having dissolved or dispensed therein an effective amount of a machine laundry detergent composition in accord with the invention. An "effective amount" of the detergent composition means from about 20 g to about 300 g of product dissolved or dispersed in a wash solution of volume from about 5 L to about 65 L. The water temperatures may range from about 5° C. to about 100° C. The water to soiled material (e.g., fabric) ratio may be from about 1:1 to about 30:1. The compositions may be employed at concentrations of from about 500 ppm to about 15,000 ppm in solution. In the context of a fabric laundry composition, usage levels may also vary depending not only on the type and severity of the soils and stains, but also on the wash water temperature, the volume of wash water, and the type of washing machine (e.g., top-loading, front-loading, vertical-axis Japanese-type automatic washing machine).

The detergent compositions herein may be used for laundering of fabrics at reduced wash temperatures. These methods of laundering fabric comprise the steps of delivering a laundry detergent composition to water to form a wash liquor and adding a laundering fabric to said wash liquor, wherein the wash liquor has a temperature of from about 0° C. to about 20° C., or from about 0° C. to about 15° C., or from about 0° C. to about 9° C. The fabric may be contacted to the water prior to, or after, or simultaneous with, contacting the laundry detergent composition with water.

Another method includes contacting a nonwoven substrate, which is impregnated with the detergent composition, with a soiled material. As used herein, "nonwoven substrate" can comprise any conventionally fashioned nonwoven sheet or web having suitable basis weight, caliper (thickness), absorbency, and strength characteristics. Non-limiting examples of suitable commercially available nonwoven substrates include those marketed under the trade names SONTARA® by DuPont and POLY WEB® by James River Corp.

Hand washing/soak methods, and combined hand washing with semi-automatic washing machines, are also included.

In one aspect, the method comprises the steps of optionally washing and/or rinsing said surface or fabric, contacting said surface or fabric with any composition disclosed in this specification then optionally washing and/or rinsing said surface or fabric is disclosed, with an optional drying step.

Drying of such surfaces or fabrics may be accomplished by any one of the common means employed either in domestic or industrial settings. The fabric may comprise any fabric capable of being laundered in normal consumer or institutional use conditions, and the invention is suitable for cellulosic substrates and in some aspects also suitable for synthetic textiles such as polyester and nylon and for treatment of mixed fabrics and/or fibers comprising synthetic and cellulosic fabrics and/or fibers. As examples of synthetic fabrics are polyester, nylon, these may be present in mixtures with cellulosic fibers, for example, polycotton fabrics. The solution typically has a pH of from 7 to 11, more usually 8 to 10.5. The compositions are typically employed at concentrations from 500 ppm to 5,000 ppm in solution. The water temperatures typically range from about 5° C. to about 90° C. The water to fabric ratio is typically from about 1:1 to about 30:1.

Packaging for the Compositions

Containers may consist of bulk loads in tank trucks, totes, drums, carboys or cylinders in any appropriate size. Most preferable containers are made from stainless steel or HDPE. Containers may be open head or tight head containers. Stainless steel containers may be unlined or optionally lined with any suitable coating, such as an epoxy or epoxy phenolic coating. Some containers may contain at least one drain valve, and containers are preferably fortifiable, stackable, and DOT/UN approved. Suitable packaging is available from a variety of suppliers such as General Steel, Mauser, Schitz, Cardinal Packaging or other vendors. For non-limiting examples, the suitable containers can be the Ecobulk MX, Ecobulk MX-EX, Ecobulk MX-EV, Ecobulk MX, Cleancert, Ecobulk MX-EX-EV Cleancert, Ecobulk SX-EX, and Ecobulk MX impeller as offered by Schuetz, Mauser® SM 6, Mauser® SM 13, Mauser® SM 15, Mauser® SM EX, Mauser® SM LP as offered by Mauser. Optionally, HDPE containers may contain additives to protect the contents from UV and visible light, such as Mauser® SM LP* totes or the like. In addition, HDPE containers may contain additional protection provided by an EVOH permeation barrier or Dualprotect system available from Schlitz packaging systems. The composition of the invention is, as is explained, relatively stable and no specific shipping or packing requirements are needed. For example, the material does not need to be packaged under an inert atmosphere or shipped with climate control to remain stable. However, the storage stability of the leuco composition can be improved by implementing certain measures. For example, it may be preferred to ship and store this material or other less stable materials under an oxygen deficient atmosphere, cold temperatures or both. One way to generate the oxygen deficient atmosphere is to use inert gas such as nitrogen, argon or carbon dioxide. The container may be purged with an inert gas for a period of time, or by evacuating and backfilling the container with the inert gas. When purging, the purging time should be at least three time longer than the time needed to fill up the head space of the container, more preferably five times longer. The inner pressure should be close to atmospheric pressure, or slightly higher than atmospheric pressure during the purge or backfill. The preferred inner pressure range is from 0.5 to 2 atm, more preferably from 0.8 to 1.5 atm, and most preferably from 0.95 to 1.2 atm. One skilled in the art will realize that the ideal pressures are the values under the conditions encountered during the purging or backfilling and the pressure of the gas will change when the temperature changes, approximatively following the ideal gas law. Additionally, the material itself may be purged with an inert gas by bubbling the inert gas through the product for a period of time before or after packaging.

For any container wherein the composition of the current invention, or even less stable materials, reside, the percentage of the container volume occupied by the material should be at least 50%, more preferably 80%, even more preferably 90% or even 95%, which in turn limits the volume that constitutes the headspace which is occupied by either ambient air, an inert gas, or mixtures thereof. For materials sensitive to oxygen, limiting the amount of oxygen present in the container will slow the conversion of the leuco compounds to the second colored state. Moreover, container designs that minimize the surface area of the interface between the material and the headspace are generally preferred. For this reason, shipping the material by means that limit the movement of the material within the container decrease the time average surface area and may contribute to increased stability of the material, especially material comprising somewhat less stable leuco compounds.

The composite of the current invention is stable enough to store and transport without climate control wherein temperatures may range from −40° C. to 60° C. depending on the climate and location. However, lower temperatures are preferred. Suitable temperature ranges for storing and transporting the chemical are from −30° C. to 60° C., more preferable from −10° C. to 50° C., most preferable from 0° C. to 35° C.

Additional protection of the product may be used such as oxygen scavengers in films, sachets or via direct incorporation into the packaging material to maintain an oxygen deficient atmosphere within the container.

Any of the precautions employed to minimize conversion of the leuco composition before incorporation into the laundry care composition as described hereinabove may be similarly applied to the storage and shipment of the laundry care composition comprising the composition.

The laundry care compositions described herein can be packaged in any suitable container including those constructed from paper, cardboard, plastic materials, and any suitable laminates. An optional packaging type is described in European Application No. 94921505.7.

Multi-Compartment Pouch

The laundry care compositions described herein may also be packaged as a multi-compartment laundry care composition.

Other Adjunct Ingredients

A wide variety of other ingredients may be used in the laundry care compositions herein, including, for example, other active ingredients, carriers, hydrotropes, processing aids, dyes or pigments, solvents for liquid formulations, solid or other liquid fillers, erythrosine, colliodal silica, waxes, probiotics, surfactin, aminocellulosic polymers, Zinc Ricinoleate, perfume microcapsules, rhamnolipds, sophorolipids, glycopeptides, methyl ester ethoxylates, sulfonated estolides, cleavable surfactants, biopolymers, silicones, modified silicones, aminosilicones, deposition aids, hydrotropes (especially cumene-sulfonate salts, toluene-sulfonate salts, xylene-sulfonate salts, and naphalene salts), PVA particle-encapsulated dyes or perfumes, pearlescent agents, effervescent agents, color change systems, silicone polyurethanes, opacifiers, tablet disintegrants, biomass fillers, fast-dry silicones, glycol distearate, starch perfume encapsulates, emulsified oils including hydrocarbon oils, polyolefins, and fatty esters, bisphenol antioxidants, micro-fibrous cellulose structurants, properfumes, styrene/acrylate polymers, triazines, soaps, superoxide dismutase, benzophenone protease inhibitors, functionalized TiO2, dibutyl phosphate, silica perfume capsules, and other adjunct ingredients, choline oxidase, triarylmethane blue and violet basic dyes, methine blue and violet basic dyes, anthraquinone blue and violet basic dyes, azo dyes basic blue 16, basic blue 65, basic blue 66 basic blue 67, basic blue 71, basic blue 159, basic violet 19, basic violet 35, basic violet 38, basic violet 48, oxazine dyes, basic blue 3, basic blue 75, basic blue 95, basic blue 122, basic blue 124, basic blue 141, Nile blue A and xanthene dye basic violet 10, an alkoxylated triphenylmethane polymeric colorant; an alkoxylated thiopene polymeric colorant; thiazolium dye, mica, titanium dioxide coated mica, bismuth oxychloride, and other actives.

Anti-oxidant: The composition may optionally contain an anti-oxidant present in the composition from about 0.001 to about 2% by weight. Preferably the antioxidant is present at a concentration in the range 0.01 to 0.08% by weight. Mixtures of anti-oxidants may be used.

One class of anti-oxidants used in the present invention is alkylated phenols. Hindered phenolic compounds are a preferred type of alkylated phenols having this formula. A preferred hindered phenolic compound of this type is 3,5-di-tert-butyl-4-hydroxytoluene (BHT).

Furthermore, the anti-oxidant used in the composition may be selected from the group consisting of α-, β-, γ-, δ-tocopherol, ethoxyquin, 2,2,4-trimethyl-1,2-dihydroquinoline, 2,6-di-tert-butyl hydroquinone, tert-butyl hydroxyanisole, lignosulphonic acid and salts thereof, and mixtures thereof.

The laundry care compositions described herein may also contain vitamins and amino acids such as: water soluble vitamins and their derivatives, water soluble amino acids and their salts and/or derivatives, water insoluble amino acids viscosity modifiers, dyes, nonvolatile solvents or diluents (water soluble and insoluble), pearlescent aids, pediculocides, pH adjusting agents, preservatives, skin active agents, sunscreens, UV absorbers, niacinamide, caffeine, and minoxidil.

The laundry care compositions of the present invention may also contain pigment materials such as nitroso, monoazo, disazo, carotenoid, triphenyl methane, triaryl methane, xanthene, quinoline, oxazine, azine, anthraquinone, indigoid, thionindigoid, quinacridone, phthalocianine, botanical, and natural colors, including water soluble components such as those having C.I. Names.

The laundry care compositions of the present invention may also contain antimicrobial agents. Cationic active ingredients may include but are not limited to n-alkyl dimethyl benzyl ammonium chloride, alkyl dimethyl ethyl benzyl ammonium chloride, dialkyl dimethyl quaternary ammonium compounds such as didecyl dimethyl ammonium chloride, N,N-didecyl-Nmethyl-poly(oxyethyl) ammonium propionate, dioctyl didecyl ammonium chloride, also including quaternary species such as benzethonium chloride and quaternary ammonium compounds with inorganic or organic counter ions such as bromine, carbonate or other moieties including dialkyl dimethyl ammonium carbonates, as well as antimicrobial amines such as Chlorhexidine Gluconate, PHMB (Polyhexamethylene biguanide), salt of a biguanide, a substituted biguanide derivative, an organic salt of a quaternary ammonium containing compound or an inorganic salt of a quaternary ammonium containing compound or mixtures thereof.

The liquid compositions, preferably the laundry care composition herein can be prepared by combining the components thereof in any convenient order and by mixing, e.g., agitating, the resulting component combination to form a phase stable liquid laundry care composition. In a process for preparing such compositions, a liquid matrix is formed containing at least a major proportion, or even substantially all, of the liquid components, e.g., nonionic surfactant, the non-surface-active liquid carriers and other optional liquid components, with the liquid components being thoroughly admixed by imparting shear agitation to this liquid combination. For example, rapid stirring with a mechanical stirrer may usefully be employed. While shear agitation is maintained, substantially all of any anionic surfactants and the solid form ingredients can be added. Agitation of the mixture is continued, and if necessary, can be increased at this point to form a solution or a uniform dispersion of insoluble solid phase particulates within the liquid phase. After some or all of the solid-form materials have been added to this agitated mixture, particles of any enzyme material to be included, e.g., enzyme prills, are incorporated. As a variation of the composition preparation procedure hereinbefore described, one or more of the solid components may be added to the agitated mixture as a solution or slurry of particles premixed with a minor portion of one or more of the liquid components. After addition of all of the composition components, agitation of the mixture is continued for a period of time sufficient to form compositions having the requisite viscosity and phase stability characteristics. Frequently this will involve agitation for a period of from about 30 to 60 minutes.

It will of course be appreciated by one skilled in the art that care must be exercised in preparing the laundry care compositions of the present invention to avoid unwanted conversion of the leuco colorant to the second colored state, or even unwanted fading of any proportion of the second colored state that may be initially present. Such events may occur if oxidants are introduced into the laundry care composition without adequate controls. It is known, for example, that oxidants are frequently used to inhibit microbial growth within many materials, including many materials that are feedstocks to the detergent manufacturing process. Typical oxidizing agents that are used for this purpose include, but are not limited to, certain oxygen allotropes (e.g., ozone), peroxides (e.g. hydrogen peroxide, benzoyl peroxide, persulfate, perborate, percarbonates), and halogen oxides (e.g., hypochlorite, chlorite, iodate). Moreover, many feedstock materials may contain levels of transition metals, like iron, that can be introduced into the laundry care composition. The skilled artisan is aware of means to overcome the potential issues that may exist due to the presence of these oxidants that are introduced from either controlled or uncontrolled sources, including, but not limited to, conventional detergent material feedstocks. Typical processes that may be utilized by the skilled artisan include, but are not limited to, chemical treatment (including, but not limited to, reduction via common reducing agents, dechlorination via common amines, catalytic hydrogen peroxide degradation via catalase, chelation of transition metals), adsorption systems (such as, but not limited to, activated carbon adsorption), ultraviolet energy treatment and/or heat treatment. The skilled artisan is aware of means to introduce these processes either as independent steps of the manufacturing system or as a single, integrated operation that leverages techniques which may include, but are not limited to, order of addition optimization, optimization of system residence time distributions and/or spatial separation to overcome the potential issues that may arise in formulating and making the laundry care formulations of the present invention. These are not unique to this specific invention but would be relevant for any laundry care formulation that incorporates a leuco colorant.

The leuco colorants of the present invention have been found to be suitable for use in liquid laundry care compositions having a wide range of pH values. For example, the inventive leuco colorants have been found to be suitable for use in liquid laundry care compositions having a pH of greater than or equal to 10. The inventive leuco colorants have also been found to be suitable for use in liquid laundry care compositions having a pH of less than 10. Thus, the leuco colorants are stable in laundry care compositions having pH values of greater than or equal to 10 and less than or equal to 10. In some embodiments, preferred pH ranges may be between about 7 and about 10. It is known that conversion of the leuco colorant to the second colored state can proceed more rapidly in acidic environments than in neutral or alkaline environments.

Test Methods Fabric swatches used in the test methods herein are obtained from Testfabrics, Inc. West Pittston, Pa., and are 100% Cotton, Style 403 (cut to 2"×2") and/or Style 464 (cut to 4"×6"), and an unbrightened multifiber fabric, specifically Style 41 (5 cm×10 cm).

All reflectance spectra and color measurements, including L*, a*, b*, K/S, and Whiteness Index (WI CIE) values on dry fabric swatches, are made using one of four spectrophotometers: (1) a Konica-Minolta 3610d reflectance spectrophotometer (Konica Minolta Sensing Americas, Inc., Ramsey, N.J., USA; D65 illumination, 10° observer, UV light excluded), (2) a LabScan XE reflectance spectrophotometer (HunterLabs, Reston, Va.; D65 illumination, 10° observer, UV light excluded), (3) a Color-Eye® 7000A (GretagMacbeth, New Windsor, N.Y., USA; D65 light, UV excluded), or (4) a Color i7 spectrophotometer (X-rite, Inc., Grand Rapids, Mich., USA; D65 light, UV excluded).

Where fabrics are irradiated, unless otherwise indicated, the specified fabrics post-dry are exposed to simulated sunlight with irradiance of 0.77 W/m² @ 420 nm in an Atlas Xenon Fade-Ometer Ci3000+ (Atlas Material Testing Technology, Mount Prospect, Ill., USA) equipped with Type S Borosilicate inner (Part no. 20277300) and outer (Part no. 20279600) filters, set at 37° C. maximum cabinet temperature, 57° C. maximum black panel temperature (BPT black panel geometry), and 35% RH (relative humidity). Unless otherwise indicated, irradiation is continuous over the stated duration.

I. Method for Determining Leuco Compound Efficiency from a Wash Solution

Cotton swatches (Style 464) are stripped prior to use by washing at 49° C. two times with heavy duty liquid laundry detergent nil brightener (1.55 g/L in aqueous solution). A concentrated stock solution of each leuco conjugate to be tested is prepared in a solvent selected from ethanol or 50:50 ethanol:water, preferably ethanol.

All L*, a*, b* and Whiteness Index (WI CIE) values for the cotton fabrics are measured on the dry swatches using a Konica-Minolta 3610d reflectance spectrophotometer.

A base wash solution is prepared by dissolving AATCC heavy duty liquid laundry detergent nil brightener (5.23 g/1.0 L) in deionized water. Four stripped cotton swatches are weighed together and placed in a 250 mL Erlenmeyer flask along with two 10 mm glass marbles. A total of three such flasks are prepared for each wash solution to be tested. The base wash solution is dosed with the leuco conjugate stock to achieve a wash solution with the desired $2.00 \times 10^{-6}$ equivalents/L wash concentration of the leuco conjugate.

An aliquot of this wash solution sufficient to provide a 10.0:1.0 liquor:fabric (w/w) ratio is placed into each of the three 250 mL Erlenmeyer flasks. Each flask is dosed with a 1000 gpg stock hardness solution to achieve a final wash hardness of 6 gpg (3:1 Ca:Mg).

The flasks are placed on a Model 75 wrist action shaker (Burrell Scientific, Inc., Pittsburgh, Pa.) and agitated at the maximum setting for 12 minutes, after which the wash solution is removed by aspiration, a volume of rinse water (0 gpg) equivalent to the amount of wash solution used is added. Each flask is dosed with a 1000 gpg stock hardness solution to achieve a final rinse hardness of 6 gpg (3:1 Ca:Mg) before agitating 4 more minutes. The rinse is removed by aspiration and the fabric swatches are spun dry (Mini Countertop Spin Dryer, The Laundry Alternative Inc., Nashua, N.H.) for 1 minute, then placed in a food dehydrator set at 135° F. to dry in the dark for 2 hours. Following this drying procedure, the samples can be stored in the dark or exposed to light for varying amounts of time before measuring the properties of the fabric.

Because consumer habits vary greatly throughout the world, the methods used must allow for the possibility of measuring the benefits of leuco compounds across conditions. One such condition is the exposure to light following drying. Some leuco compounds will not exhibit as large a benefit under dark storage as under light storage, so each leuco compound must be tested under both sets of conditions to determine the optimum benefit. Therefore Method I includes exposure of the dried fabrics to simulated sunlight for various increments of time before measurements are taken, and the LCE value is set to the maximum value obtained from the set of exposure times described below.

A. Dark Conditions Post-Dry

After drying, the fabrics are stored in the dark at room temperature between measurement time points. L*, a*, b* and Whiteness Index (WI CIE) values for the cotton fabrics are measured at time t=0, 6, 24 and 48 hours after the conclusion of the two hour drying period. The values of the 12 swatches generated for each leuco colorant (three flasks with four swatches each) are averaged to arrive at the sample values for L*, a*, b* and WI CIE at each time point t.

In order to obtain L*, a*, b* and Whiteness Index (WI CIE) values for the control treatment, the above procedure is repeated as described with the following exceptions: (1) the control base wash solution is prepared using AATCC heavy duty liquid laundry detergent nil brightener (5.23 g/1.0 L) in deionized water, and (2) the values of the 12 swatches generated for the control measured after the drying period are averaged to arrive at the sample values for L*, a*, b* and WI CIE and the control value at t=0 is also used as the control values for t=6, 24 and 48 hours.

The leuco colorant efficiency (LCE) of the leuco colorant in the laundry care formulation is calculated based on the data collected at each time point t using the following equation:

$$LCE_t = DE^* = ((L^*_c - L^*_s)^2 + (a^*_c - a^*_s)^2 + (b^*_c - b^*_s)^2)^{1/2}$$

wherein the subscripts c and s respectively refer to the control, i.e., the fabric washed in AATCC heavy duty liquid laundry detergent nil brightener, and the sample, i.e., the fabric washed in the laundry care formualtion containing leuco colorant, where the values used to calculate $LCE_t$ are those at the corresponding time points t (0, 6, 24 or 48 hours).

The WI CIE values of the 12 swatches generated for each wash solution (three flasks with four swatches each) are averaged and the change in whiteness index on washing is calculated using the following equation:

$$\Delta WI = WI\ CIE(\text{after wash}) - WI\ CIE(\text{before wash})$$

There will be a separate value for the laundry care formulation ($\Delta WI_{sample}$) and the AATCC HDL nil brightener ($\Delta WI_{control}$). The change in whiteness between the two formulations is given by:

$$\delta\Delta WI = \Delta WI_{sample} - \Delta WI_{control}$$

B. Light Conditions Post-Dry

The specified cotton fabrics post-dry are exposed to simulated sunlight for 15 min, 30 min, 45 min, 60 min, 75 min, 90 min, 120 min, and 240 min. The L*, a*, b* and Whiteness Index (WI CIE) values for the cotton fabrics are measured on the swatches after each exposure period. The calculation of the LCE and the AWI value at each exposure time point is as described in Method I.A. above, and the LCE values and the AWI values for the sample and control laundry care formulations are set to the maximum values obtained from the set of exposure times listed.

II. Method for Determining Relative Hue Angle (vs. AATCC Control) The relative hue angle delivered by a leuco colorant to cotton fabrics treated according to Method I described above is determined as follows.

a) The a* and b* values of the 12 swatches from each solution are averaged and the following formulas used to determine $\Delta a^*$ and $\Delta b^*$:

$$\Delta a^* = a^*_s - a^*_c \text{ and } \Delta b^* = b^*_s - b^*_c$$

wherein the subscripts c and s respectively refer to the fabric washed in AATCC Heavy duty liquid detergent nil brightener (control) and the fabric washed in the laundry care formulation containing leuco colorant (sample).

b) If the absolute value of both $\Delta a^*$ and $\Delta b^* < 0.25$, no Relative Hue Angle (RHA) is calculated. If the absolute value of either $\Delta a^*$ or $\Delta b^*$ is $\geq 0.25$, the RHA is determined using one of the following formulas:

$$RHA = A\ TAN\ 2(\Delta a^*, \Delta b^*) \text{ for } \Delta b^* \geq 0$$

$$RHA = 360 + A\ TAN\ 2(\Delta a^*, \Delta b^*) \text{ for } \Delta b^* < 0$$

A relative hue angle can be calculated for each time point where data is collected in either the dark post-dry or light post-dry assessments. Any of these points may be used to satisfy the requirements of a claim.

III. Method for Determination of Surface Tension Value for a Substituted Diarylamine, a Leuco Colorant and the Oxidized Form of the Leuco Colorant.

The material to be tested is either a substituted diarylamine, a leuco colorant according to the instant invention, or the dye that represents the second colored state of the leuco colorant (for example, a triarylmethane dye). A total of 250-255 mg of the material to be tested is weighed into a 4 oz. glass jar and 50.0 mL deionized water (Barnstead B-Pure System, about 17.27 ohm) is added along with a magnetic stir bar. The jar is capped, placed on a magnetic stir plate, and the mixture stirred for one hour at 22.0° C. Thereafter the stirring is stopped and the mixture left to stand undisturbed for one hour. At the end of that time, 10.0 mL of solution is pulled into a syringe which is then fitted with a glass fiber Acrodisc® filter and the aliquot filtered into a 20 mL scintillation vial. A VWR LabMax Pipettor is used to pipette to deliver 45.0 microliters of the filtered solution into each of eight separate wells of a 96-well plate. The solutions are tested at approximately 22.0° C. with a Kibron Delta 8 Tensiometer and the average value of the eight measured replicates reported as the Surface Tension Value in mN/m.

IV. Method for Determining Lightness (L*), Chroma (C*) and Hue (h*) of a Laundry Care Formulation The aesthetic appearance of laundry care formulation is measured on a LabScan XE reflectance spectrophotometer (HunterLabs, Reston, Va.; D65 illumination, 10° observer, UV light excluded) utilizing the Translucent Sample Set (Part no. LSXE-SC-ASSY) including sample cup, ring and disk set, sample cup port insert (1.75"), and opaque cover. Step by step instructions are found in Hunter Labs Applications Note, Vol. 11, No. 3, 2008. The final values for a given laundry care formulation are the average of the values from three external replicate measurements.

The purpose of the ring and disk set is to control the liquid characteristics and extra light interactions (diffusion and transmission) associated with translucent liquid samples, thus making these samples more like the opaque samples the sensor was designed to measure.

When the ring and disk set is used to measure a liquid, the black plastic ring is first placed in the sample cup to fix the internal path length of light through the liquid sample to 10 mm while excluding outside light that can cause measurement interference. The liquid is poured into the cup until the level of liquid is higher than the top of the black ring.

The white ceramic disk is lowered into the liquid until it sits on top of the ring. The disk provides a white background to direct light that has traveled through the liquid back to the detector. A black sample cup cover is then placed over the sample cup to prevent any ambient light from outside the instrument from leaking into the detector. The liquid sample is measured through the bottom of an excellent optical-quality quartz sample cup as part of the ring and disk set, and is used with the accompanying port insert. Step-by-step instructions for using the ring and disk set are provided below.

1. Orient the instrument so that the sample port is facing up. Replace the regular port insert with the special port insert for the sample cup.
2. Standardize the instrument with the special port insert in place.
3. Insert the 10-mm black ring into the cup so that it settles flat on the bottom of the cup.
4. Fill the cup with the liquid sample until the liquid is above the level of the ring.
5. Float the white ceramic disk down through the liquid sample until it rests firmly on top of the black float ring. The goal is to have the sample appear smooth and opaque through the glass bottom of the sample cup.

V. Method for Determining the Color Formation Index (CFI) of an Antioxidant and/or Antioxidant Composition.

The efficacy of an antioxidant and/or antioxidant composition to control conversion of a leuco colorant during storage is related to the antioxidant composition's Color Formation Index (CFI) value. To determine this value, liquid detergent samples are prepared, all using AATCC heavy duty liquid laundry detergent nil brightener (designated simply as AATCC HDL below). A series of heavy duty liquid detergent formulations, some comprising Leuco colorant 1, is prepared having the composition as described in Table 1 below. Leuco colorant 1 may be prepared following the general synthetic procedures described in US Patent Application 2016/0326467 A1, paragraphs [0331]-[0038]. AE7 is a $C_{12-13}$ alcohol ethoxylate, with an average degree of ethoxylation of 7.

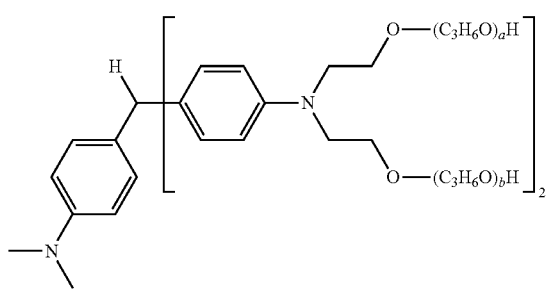

Leuco colorant 1 (a+b=2.5, sum of all a+b=5.0)

TABLE 1

Heavy Duty Liquid Detergent Formulations A-H.

| Raw Material | Formulation Example | | | | | | | |
|---|---|---|---|---|---|---|---|---|
| | A | B | C | D | E | F | G | H |
| AATCC HDL | Balance | | | | | | | |
| Leuco colorant 1 | x | x | x | x | ✓ | ✓ | ✓ | ✓ |
| Hindered phenol | x | ✓ | x | ✓ | x | ✓ | x | ✓ |
| Substituted diarylamine | x | x | ✓ | ✓ | x | x | ✓ | ✓ |
| AE7 NI surfactant | ✓ | ✓ | ✓ | ✓ | ✓ | ✓ | ✓ | ✓ |

Concentrations for each of the materials, where present, are provided below:

Leuco colorant 1: 0.020 wt %.

Hindered phenol: equimolar to 0.10 wt % BHT.

Substituted diarylamine: equimolar to 0.01 wt % 4-(1,1,3,3-tetramethylbutyl)-N-[4-(1,1,3,3-tetramethylbutyl)phenyl]-Benzenamine.

AE7: 2.0 wt %; each antioxidant is dissolved into the AE7 NI for incorporation into the formulations.

Once prepared, the color of each detergent formulation is measured using Method IV above and thereafter each formulation is stored in the dark at 40° C. Samples are remeasured for color using Method IV after 7, 14 and 28 days. The absorbance (597 nm; 1.0 cm path length) is measured for each formulation on day 0, 7, 14 and 28.

The CFI is calculated using the absorbance values at 597 nm from the following Formulation pairs:

| Control | Sample | Comments |
|---|---|---|
| A | E | Conversion without any antioxidant |
| B | F | $CFI_{Hindered\ Phenol}$: Conversion with hindered phenol alone |
| C | G | $CFI_{Substituted\ Diarylamine}$: Conversion with substituted diarylamine alone |
| D | H | $CFI_{Antioxidant\ Composition}$: Conversion with antioxidant composition |

The equation yielding the CFI value for any given Formulation pair (A/E, B/F or C/G or D/H) on Day x (where x is 7, 14 and 28) is:

$$CFI_{Day\ x} = [(\Delta A_{S(x-0)} - \Delta A_{C(x-0)})/(\Delta A_{E(x-0)} - \Delta A_{A(x-0)})] \times 100\%$$

where $\Delta A$ refers to the change in absorbance at 597 nm for a formula between day x and day 0, the subscripts C and S refer to the control and sample formulations, respectively, in the formulation pairs A/E, B/F, C/G and D/H, and the subscripts A and E refer to formulations A and E.

By way of example, the CFI for the hindered phenol alone (formulation pair B/F) on Day 14 would be calculated using the following equation:

$$CFI_{Day\ 14} = [(\Delta A_{F(14-0)} - \Delta A_{B(14-0)})/(\Delta A_{E(14-0)} - \Delta A_{A(14-0)})] \times 100\%$$

A CFI value is calculated for each time point where data is collected (days 7, 14 and 28). The CFI value at any of these points may be used to satisfy the requirements of a claim.

Example 1

The CFI values for the hindered phenol 2,6-bis(1,1-dimethylethyl)-4-methyl-phenol, for the substituted diarylamine 4-(1,1,3,3-tetramethylbutyl)-N-[4-(1,1,3,3-tetramethylbutyl)phenyl]-Benzenamine, and for a combination of these two antioxidants, were determined according to Method V. The absorbance data collected over time is shown below:

| | Absorbance (597 nm) of Formulation Example | | | | | | | |
|---|---|---|---|---|---|---|---|---|
| Day x | A | B | C | D | E | F | G | H |
| 0 | 0.0021 | 0.0021 | 0.0041 | 0.0018 | 0.0162 | 0.0131 | 0.0208 | 0.0123 |
| 7 | 0.0022 | 0.0021 | 0.0025 | 0.0022 | 0.0796 | 0.0326 | 0.0378 | 0.0223 |
| 14 | 0.0109 | 0.0097 | 0.0117 | 0.0102 | 0.1224 | 0.0607 | 0.0697 | 0.0425 |
| 28 | 0.0021 | 0.0044 | 0.0043 | 0.0065 | 0.1604 | 0.072 | 0.0731 | 0.0433 |

The CFI values calculated from the above data are given in the table below.

| Day x | $CFI_{Hindered\ Phenol}$ | $CFI_{Substituted\ Diarylamine}$ | $CFI_{Antioxidant\ Composition}$ |
|---|---|---|---|
| 7 | 30.8 | 29.4 | 15.2 |
| 14 | 41.1 | 42.4 | 22.4 |
| 28 | 39.3 | 36.1 | 18.2 |

Use of either the hindered phenol alone, or use of the substituted diarylamine alone, provide approximately similar amounts of color control on storage at each time point. It is clear, however, that there is a marked reduction in the CFI value at each time point when employing a combination of both a hindered phenol and a substituted diarylamine over use of either species alone.

Formulation Examples

The following are illustrative examples of laundry care compositions according to the present disclosure and are not intended to be limiting. Addition systems in commercial plants are such that the amount dosed can vary by as much as ±20% of the target value, so that the specific levels disclosed in any formulation herein should be understood to include the values encompassed by the ±20% variance.

Examples 3 to 9: Heavy Duty Liquid Laundry Detergent Compositions

| Ingredients | 3 | 4 | 5 | 6 % weight | 7 | 8 | 9 |
|---|---|---|---|---|---|---|---|
| $AE_{1.8}S$ | 6.77 | 5.16 | 1.36 | 1.30 | — | — | — |
| $AE_3S$ | — | — | — | — | 0.45 | — | — |
| LAS | 0.86 | 2.06 | 2.72 | 0.68 | 0.95 | 1.56 | 3.55 |
| HSAS | 1.85 | 2.63 | 1.02 | — | — | — | — |
| AE9 | 6.32 | 9.85 | 10.20 | 7.92 | | | |
| AE8 | | | | | | | 35.45 |
| AE7 | | | | | 8.40 | 12.44 | |
| $C_{12-14}$ dimethyl Amine Oxide | 0.30 | 0.73 | 0.23 | 0.37 | — | — | — |
| $C_{12-18}$ Fatty Acid | 0.80 | 1.90 | 0.60 | 0.99 | 1.20 | — | 15.00 |
| Citric Acid | 2.50 | 3.96 | 1.88 | 1.98 | 0.90 | 2.50 | 0.60 |
| Optical Brightener 1 | 1.00 | 0.80 | 0.10 | 0.30 | 0.05 | 0.50 | 0.001 |
| Optical Brightener 3 | 0.001 | 0.05 | 0.01 | 0.20 | 0.50 | — | 1.00 |
| Sodium formate | 1.60 | 0.09 | 1.20 | 0.04 | 1.60 | 1.20 | 0.20 |
| DTI | 0.32 | 0.05 | — | 0.60 | — | 0.60 | 0.01 |
| Sodium hydroxide | 2.30 | 3.80 | 1.70 | 1.90 | 1.70 | 2.50 | 2.30 |
| Monoethanolamine | 1.40 | 1.49 | 1.00 | 0.70 | — | — | — |
| Hindered Phenol | 0.05 | 0.3 | 0.2 | 0.1 | 0.025 | 0.075 | 0.01 |
| Substituted Diarylamine | 0.014 | 0.048 | 0.032 | 0.0085 | 0.0021 | 0.0043 | 0.0005 |
| Diethylene glycol | 5.50 | — | 4.10 | — | — | — | — |
| Chelant 1 | 0.15 | 0.15 | 0.11 | 0.07 | 0.50 | 0.11 | 0.80 |
| 4-formyl-phenylboronic acid | — | — | — | — | 0.05 | 0.02 | 0.01 |
| Sodium tetraborate | 1.43 | 1.50 | 1.10 | 0.75 | — | 1.07 | — |
| Ethanol | 1.54 | 1.77 | 1.15 | 0.89 | — | 3.00 | 7.00 |
| Polymer 1 | 0.10 | — | — | — | — | — | 2.00 |
| Polymer 2 | 0.30 | 0.33 | 0.23 | 0.17 | — | — | — |
| Polymer 3 | — | — | — | — | — | — | 0.80 |
| Polymer 4 | 0.80 | 0.81 | 0.60 | 0.40 | 1.00 | 1.00 | — |
| 1,2-Propanediol | — | 6.60 | — | 3.30 | 0.50 | 2.00 | 8.00 |
| Structurant | 0.10 | — | — | — | — | — | 0.10 |
| Perfume | 1.60 | 1.10 | 1.00 | 0.80 | 0.90 | 1.50 | 1.60 |
| Perfume encapsulate | 0.10 | 0.05 | 0.01 | 0.02 | 0.10 | 0.05 | 0.10 |
| Protease | 0.80 | 0.60 | 0.70 | 0.90 | 0.70 | 0.60 | 1.50 |
| Mannanase | 0.07 | 0.05 | 0.045 | 0.06 | 0.04 | 0.045 | 0.10 |
| Amylase 1 | 0.30 | — | 0.30 | 0.10 | — | 0.40 | 0.10 |
| Amylase 2 | — | 0.20 | 0.10 | 0.15 | 0.07 | — | 0.10 |
| Xyloglucanase | 0.20 | 0.10 | — | — | 0.05 | 0.05 | 0.20 |
| Lipase | 0.40 | 0.20 | 0.30 | 0.10 | 0.20 | — | — |
| Polishing enzyme | — | 0.04 | — | — | — | 0.004 | — |
| Nuclease | 0.05 | — | — | — | — | — | 0.003 |
| Dispersin B | — | — | — | 0.05 | 0.03 | 0.001 | 0.001 |
| Liquitint ® V200 | 0.02 | — | — | — | — | — | 0.005 |
| Leuco colorant | 0.05 | 0.2 | 0.1 | 0.01 | 0.005 | 0.01 | 0.02 |
| Dye control agent | — | 0.3 | — | 0.03 | — | 0.3 | 0.3 |
| Water, dyes & minors | | | | Balance | | | |
| pH | | | | 8.2 | | | |

Based on total cleaning and/or treatment composition weight. Enzyme levels are reported as raw material.

Examples 10 to 20: Unit Dose Compositions

These examples provide various formulations for unit dose laundry detergents. Compositions 10 to 14 comprise a single unit dose compartment. The film used to encapsulate the compositions is polyvinyl-alcohol-based film.

| Ingredients | 10 | 11 | 12 | 13 | 14 |
|---|---|---|---|---|---|
| | | | % weight | | |
| LAS | 19.09 | 16.76 | 8.59 | 6.56 | 3.44 |
| AE3S | 1.91 | 0.74 | 0.18 | 0.46 | 0.07 |
| AE7 | 14.00 | 17.50 | 26.33 | 28.08 | 31.59 |
| Citric Acid | 0.6 | 0.6 | 0.6 | 0.6 | 0.6 |
| C12-15 Fatty Acid | 14.8 | 14.8 | 14.8 | 14.8 | 14.8 |
| Polymer 3 | 4.0 | 4.0 | 4.0 | 4.0 | 4.0 |
| Chelant 2 | 1.2 | 1.2 | 1.2 | 1.2 | 1.2 |
| Optical Brightener 1 | 0.20 | 0.25 | 0.01 | 0.01 | 0.50 |
| Optical Brightener 2 | 0.20 | — | 0.25 | 0.03 | 0.01 |
| Optical Brightener 3 | 0.18 | 0.09 | 0.30 | 0.01 | — |
| DTI | 0.10 | — | 0.20 | — | — |
| Glycerol | 6.1 | 6.1 | 6.1 | 6.1 | 6.1 |
| Monoethanol amine | 8.0 | 8.0 | 8.0 | 8.0 | 8.0 |
| Tri-isopropanol amine | — | — | 2.0 | — | — |
| Tri-ethanol amine | — | 2.0 | — | — | — |
| Hindered Phenol | 0.05 | 0.1 | 0.075 | 0.01 | 0.025 |
| Substituted Diarylamine | 0.0028 | 0.0057 | 0.0063 | 0.0016 | 0.0076 |
| Cumene sulfonate | — | — | — | — | 2.0 |
| Protease | 0.80 | 0.60 | 0.07 | 1.00 | 1.50 |
| Mannanase | 0.07 | 0.05 | 0.05 | 0.10 | 0.01 |
| Amylase 1 | 0.20 | 0.11 | 0.30 | 0.50 | 0.05 |
| Amylase 2 | 0.11 | 0.20 | 0.10 | — | 0.50 |
| Polishing enzyme | 0.005 | 0.05 | — | — | — |
| Nuclease | 0.- | 0.05 | — | — | 0.005 |
| Dispersin B | 0.010 | 0.05 | 0.005 | 0.005 | — |
| Cyclohexyl dimethanol | — | — | — | 2.0 | — |
| Leuco compound | 0.06 | 0.3 | 0.1 | 0.01 | 0.04 |
| Liquitint ® V200 | — | — | 0.01 | 0.05 | — |
| Structurant | 0.14 | 0.14 | 0.14 | 0.14 | 0.14 |
| Perfume | 1.9 | 1.9 | 1.9 | 1.9 | 1.9 |
| Dye control agent | 0.1 | 0.3 | 0.2 | 0.5 | 0.3 |
| Water and miscellaneous | | | To 100% | | |
| pH | | | 7.5-8.2 | | |

Based on total cleaning and/or treatment composition weight. Enzyme levels are reported as raw material.

In the following examples the unit dose has three compartments, but similar compositions can be made with two, four or five compartments. The film used to encapsulate the compartments is polyvinyl alcohol.

| | Base compositions | | | |
|---|---|---|---|---|
| Ingredients | 15 | 16 | 17 | 18 |
| | | % weight | | |
| HLAS | 26.82 | 16.35 | 7.50 | 3.34 |
| AE7 | 17.88 | 16.35 | 22.50 | 30.06 |
| Citric Acid | 0.5 | 0.7 | 0.6 | 0.5 |
| C12-15 Fatty acid | 16.4 | 6.0 | 11.0 | 13.0 |
| Polymer 1 | 2.9 | 0.1 | — | — |
| Polymer 3 | 1.1 | 5.1 | 2.5 | 4.2 |
| Cationic cellulose polymer | — | — | 0.3 | 0.5 |
| Polymer 6 | — | 1.5 | 0.3 | 0.2 |
| Chelant 2 | 1.1 | 2.0 | 0.6 | 1.5 |
| Optical Brightener 1 | 0.20 | 0.25 | 0.01 | 0.005 |
| Optical Brightener 3 | 0.18 | 0.09 | 0.30 | 0.005 |
| DTI | 0.1 | — | 0.05 | — |
| Glycerol | 5.3 | 5.0 | 5.0 | 4.2 |
| Monoethanolamine | 10.0 | 8.1 | 8.4 | 7.6 |
| Polyethylene glycol | — | — | 2.5 | 3.0 |
| Potassium sulfite | 0.2 | 0.3 | 0.5 | 0.7 |
| Protease | 0.80 | 0.60 | 0.40 | 0.80 |
| Amylase 1 | 0.20 | 0.20 | 0.200 | 0.30 |
| Polishing enzyme | — | — | 0.005 | 0.005 |
| Nuclease | 0.05 | — | — | — |
| Dispersin B | — | 0.010 | 0.010 | 0.010 |
| MgCl$_2$ | 0.2 | 0.2 | 0.1 | 0.3 |
| Structurant | 0.2 | 0.1 | 0.2 | 0.2 |
| Acid Violet 50 | 0.04 | 0.03 | 0.05 | 0.03 |
| Perfume/encapsulates | 0.10 | 0.30 | 0.01 | 0.05 |
| Dye control agent | 0.2 | 0.03 | 0.4 | — |
| Solvents and misc. | | To 100% | | |
| pH | | 7.0-8.2 | | |

| | Finishing compositions | | | | | |
|---|---|---|---|---|---|---|
| | 19 | | | 20 | | |
| | Compartment | | | | | |
| | A | B | C | A | B | C |
| | Volume of each compartment | | | | | |
| | 40 ml | 5 ml | 5 ml | 40 ml | 5 ml | 5 ml |
| Ingredients | Active material in Wt. % | | | | | |
| Perfume | 1.6 | 1.6 | 1.6 | 1.6 | 1.6 | 1.6 |
| Liquitint ® V200 | 0 | 0.006 | 0 | 0 | 0.004 | — |

-continued

| | | | | | | |
|---|---|---|---|---|---|---|
| Leuco compound | — | 0.2 | — | 0.04 | — | — |
| Hindered Phenol | — | 1.0 | — | 0.35 | — | — |
| Substituted Diarylamine | — | 0.15 | — | 0.020 | — | — |
| TiO2 | — | — | 0.1 | — | — | 0.1 |
| Sodium Sulfite | 0.4 | 0.4 | 0.4 | 0.1 | 0.3 | 0.3 |
| Polymer 5 | — | | | 2 | — | — |
| Hydrogenated castor oil | 0.14 | 0.14 | 0.14 | 0.14 | 0.14 | 0.14 |
| Base Composition 13, 14, 15 or 16 | | | Add to 100% | | | |

Based on total cleaning and/or treatment composition weight, enzyme levels are reported as raw material.

| | |
|---|---|
| AE1.8S | is $C_{12-15}$ alkyl ethoxy (1.8) sulfate |
| AE3S | is $C_{12-15}$ alkyl ethoxy (3) sulfate |
| AE7 | is $C_{12-13}$ alcohol ethoxylate, with an average degree of ethoxylation of 7 |
| AE8 | is $C_{12-13}$ alcohol ethoxylate, with an average degree of ethoxylation of 8 |
| AE9 | is $C_{12-13}$ alcohol ethoxylate, with an average degree of ethoxylation of 9 |
| Amylase 1 | is Stainzyme ®, 15 mg active/g, supplied by Novozymes |
| Amylase 2 | is Natalase ®, 29 mg active/g, supplied by Novozymes |
| Amylase 3 | is Stainzyme Plus ®, 20 mg active/g, supplied by Novozymes |
| AS | is $C_{12-14}$ alkylsulfate |
| Xyloglucanase | is Whitezyme ®, 20 mg active/g, supplied by Novozymes |
| Chelant 1 | is diethylene triamine pentaacetic acid; may be combined with Chelant 3 |
| Chelant 2 | is 1-hydroxyethane 1,1-diphosphonic acid; may be combined with Chelant 3 |
| Chelant 3 | is diethylene triamine; may be combined with Chelant 1 or 2 |
| Dispersin B | is a glycoside hydrolase, reported as 1000 mg active/g |
| DTI | is either poly(4-vinylpyridine-1-oxide) (such as Chromabond S-403E ®), or poly(1-vinylpyrrolidone-co-1-vinylimidazole) (such as Sokalan HP56 ®). |
| Dye control agent | Dye control agent in accordance with the invention, for example Suparex ® O.IN (M1), Nylofixan ® P (M2), Nylofixan ® PM (M3), or Nylofixan ® HF (M4) |
| Hindered Phenol | Antioxidant selected from 2,6-bis(1,1-dimethylethyl)-4-methyl-phenol, 3,5-bis(1,1-dimethylethyl)-4-hydroxy-benzenepropanoic acid, methyl ester, and (1,1-dimethylethyl)-4-methoxyphenol. |
| HSAS | is mid-branched alkyl sulfate as disclosed in U.S. Pat. No. 6,020,303 and U.S. Pat. No. 6,060,443 |
| LAS | is linear alkylbenzenesulfonate having an average aliphatic carbon chain length $C_9$-$C_{15}$ (HLAS is acid form). |
| Leuco colorant | Any suitable leuco colorant or mixtures thereof according to the instant invention. |
| Lipase | is Lipex ®, 18 mg active/g, supplied by Novozymes |
| Liquitint ® V200 | is a thiophene azo dye provided by Milliken |
| Mannanase | is Mannaway ®, 25 mg active/g, supplied by Novozymes |
| Nuclease | is a Phosphodiesterase SEQ ID NO 1, reported as 1000 mg active/g |
| Optical Brightener 1 | is disodium 4,4'-bis{[4-anilino-6-morpholino-s-triazin-2-yl]-amino}-2,2'-stilbenedisulfonate |
| Optical Brightener 2 | is disodium 4,4'-bis-(2-sulfostyryl)biphenyl (sodium salt) |
| Optical Brightener 3 | is Optiblanc SPL10 ® from 3V Sigma |
| Perfume encapsulate | is a core-shell melamine formaldehyde perfume microcapsules. |
| Polishing enzyme | is Para-nitrobenzyl esterase, reported as 1000 mg active/g |
| Polymer 1 | is bis(($C_2H_5O$)($C_2H_4O$)n)($CH_3$)—$N^+$—$C_xH_{2x}$—$N^+$—($CH_3$)-bis(($C_2H_5O$)($C_2H_4O$)n), wherein n = 20-30, x = 3 to 8 or sulphated or sulfonated variants thereof |
| Polymer 2 | is ethoxylated ($EO_{15}$) tetraethylene pentamine |
| Polymer 3 | is ethoxylated polyethylenimine |
| Polymer 4 | is ethoxylated hexamethylene diamine |
| Polymer 5 | is Acusol 305, provided by Rohm&Haas |
| Polymer 6 | is a polyethylene glycol polymer grafted with vinyl acetate side chains, provided by BASF. |
| Protease | is Purafect Prime ®, 40.6 mg active/g, supplied by DuPont |
| Protease 2 | is Savinase ®, 32.89 mg active/g, supplied by Novozymes |
| Protease 3 | is Purafect ®, 84 mg active/g, supplied by DuPont |
| Structurant | is Hydrogenated Castor Oil |
| Substituted Diarylamine | Antioxidant selected from 4-(1,1,3,3-tetramethylbutyl)-N-[4-(1,1,3,3-tetramethylbutyl)phenyl]benzenamine and 4-(1-methyl-1-phenylethyl)-N-[4-(1-methyl-1-phenylethyl)phenyl]benzenamine. |

Example 21

A representative leuco composition (Sample 21-1) was made by the following procedure. One mole of p-dimethylamino benzaldehyde was mixed with 2.1 mole of alkoxylated aniline, 3 moles of hydrochloric acid and a catalytic amount urea. The reaction was stirred at 95° C. for 6 hours under a nitrogen atmosphere. The reaction was cooled to room temperature and then neutralized with sodium hydroxide to a pH of about 8. The water phase was separated, and the organic phase was further washed with sodium sulfate solution. Then, the product was diluted with a polyethylene glycol to about 33% concentration. In addition to the leuco compound and the polyethylene glycol, the leuco composition also contained about 5% water, excess alkoxylated aniline, a trace amount of sodium salt, and urea.

To stabilize the leuco composition, the following compositions were made by combining the leuco composition with various amounts of 3,5-di-tert-butyl-4-hydroxytoluene (BHT). The percentages used in each composition are set forth in the following table.

| Sample | BHT |
|---|---|
| 21-1 |  |
| 21-2 | 1% |
| 21-3 | 0.25% |
| 21-4 | 0.05% |

The samples (21-1-21-4) were aged at 40° C. for 12 weeks. Samples were taken after 4, 8 and 12 weeks. The samples were dissolved in methanol at about 1 g/L. The methanol solution was read by an UV-VIS with 1 cm UV cell to obtain the maximum absorbance at about 597 nm.

The color value (CV) was calculated by the following equation:

CV=Absorbance/(Concentration of sample in unit of g/L)

The CV obtained is directly correlated to concentration of the oxidized leuco compound.

| Sample | CV at 597 initial | CV at 597 40° C., 4 wk | CV at 597 40° C., 8 wk | CV at 597 40° C., 12 wk |
|---|---|---|---|---|
| 21-1 | 0.046 | 0.008 | 0.012 | 0.016 |
| 21-2 | 0.010 | 0.008 | 0.015 | 0.024 |
| 21-3 | 0.012 | 0.008 | 0.018 | 0.023 |
| 21-4 | 0.012 | 0.008 | 0.016 | 0.026 |

From the table above, the Samples 21-2-21-4, which contained BHT, performed essentially same as Sample 21-1, which was the leuco composition without any BHT added. Thus, the addition of up to 1 wt. % BHT (mole ratio of about 0.1) did not appear to show any benefit. The inventors then sought to determine if antioxidant levels that are much higher than those typically used (mole ratio of total antioxidant to leuco compounds is greater than 0.5:1, or 1:1, or even 2:1) would better stabilize the leuco compounds.

Example 22

A composition (Sample 22) was prepared using the components listed in the table below:

| Material | Wt. % composition |
|---|---|
| Lorodac 7-26, non-ionic 24-7 | 74.4% |
| BHT | 14.0% |
| P-diol (propylene glycol) | 4.7% |
| Sample 21-1 | 7.0% |

In Sample 22, the mole ratio of AO (BHT) and leuco colorant is about 20:1. Sample 22 was stored at 40° C. for 4 weeks and a sample was dissolved in methanol at 2 wt % (equivalent to 1.4 g/L of preparative example 1 in methanol). The CV for Sample 22 after 4 weeks storage was zero as measured by the UV-VIS method, in comparison to an obtained CV of 0.008 for Sample 21-1.

After 4 weeks storage, 4.28% of the Sample 22 was added to AATCC HDL. For comparison, 3000 ppm of Sample 21-1 was added to AATCC detergent as well. These different amounts of the two samples were used to ensure that both detergents contained the same initial amount of the leuco compound.

The AATCC detergent samples were measured with a Color i7 spectrophotometer (X-rite, Inc., Grand Rapids, Mich., USA; D65 light, UV excluded) in transmission mode with 1 cm sample cell. The L*, a* and b* values of the two AATCC detergent samples are listed below:

| Sample | L* | a* | b* |
|---|---|---|---|
| 22 | 95.66 | −1.52 | 5.11 |
| 21-1 | 93.14 | −2.59 | 3.41 |

From the table, it is clear the AATCC sample prepared with Sample 22 is less blue (higher b*) in comparison the AATCC sample prepared with Sample 21-1, which contained no antioxidants. More importantly, the AATCC sample prepared with Sample 22 also has a higher L* value, indicating a lighter color.

Example 23

Two compositions (Samples 23-1 and 23-2) were made with the components listed in the table below:

| Material | Sample 23-1 | Sample 23-2 |
|---|---|---|
| AE7 | 61.3% | 59.8% |
| BHT | 5% | 0 |
| Ralox 35 | 0 | 6.6% |
| MD 40 | 5% | 5% |
| P-diol (propylene glycol) | 3.2% | 3.1% |
| Leuco (33% active) | 25.5% | 25.5% |

Ralox 35 is methyl 4-hydroxy-3,5-di-tert-butylphenylpropionate (CAS number 6386-38-5) and MD-40 is 4,4'-bis(phenylisopropyl)diphenylamine (CAS number 10081-67-1). The mole ratio of the total antioxidants to leuco compounds in each sample was about 3:1.

Examples were stored at 40° C. and 60° C. for 4 weeks. After storage, the CV was measured and listed in the table below. Because of the very low CV values, higher concentrations were used when dissolving in methanol. The sample concentration used for these measurements was equivalent to 5.1 g/L of Sample 21-1.

|  | Sample 23-1 | Sample 23-2 | Sample 21-1 |
|---|---|---|---|
| Stored 40° C. | 0 | 0.0012 | 0.008 |
| Stored at 60° C. | 0 | 0.0008 | — |

As one can see, Samples 23-1 and 23-2 which contain higher levels of antioxidants showed improved stability relative to Sample 21-1 which did not contain antioxidants.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

We claim:

1. A composition comprising: (a) a leuco composition; and (b) a stabilizing amount of an antioxidant composition which comprises at least one sterically hindered phenol and at least one substituted diarylamine, wherein (i) the leuco composition is from about 5 wt. % to about 20 wt. % of the composition and (ii) the mole ratio of the hindered phenol to the substituted diarylamine is greater than 1:1.

2. The composition of claim 1, wherein the composition comprises about 1 wt. % or more sterically hindered phenol compounds.

3. The composition of claim 2, wherein the mole ratio of the hindered phenol to the substituted diarylamine is greater than 5.0:1.0.

4. A composition comprising: (a) a leuco composition; and (b) an antioxidant composition, wherein (i) the combined mass of the leuco compounds and antioxidants present in the composition is 10% or more of the total mass of the composition, and (b) the molar ratio of antioxidants present in the composition to leuco compounds present in the composition is greater than 1:1.

5. The composition of claim 4, wherein the antioxidant composition comprises at least one sterically hindered phenol and at least one substituted diarylamine.

6. The composition of claim 5, wherein the hindered phenol is selected from the group consisting of 2,6-bis(1-methylpropyl)phenol; 2,6-bis(1,1-dimethylethyl)-4-methylphenol; 2-(1,1-dimethylethyl)-1,4-benzenediol; 2,4-bis(1,1-dimethylethyl)-phenol; 2,6-bis(1,1-dimethylethyl)-phenol; 3,5-bis(1,1-dimethylethyl)-4-hydroxy-benzenepropanoic acid, methyl ester; 2-(1,1-dimethylethyl)-4-methylphenol; 2-(1,1-dimethylethyl)-4,6-dimethyl-phenol; 3,5-bis(1,1-dimethylethyl)-4-hydroxybenzenepropanoic acid, 1,1'-[2,2-bis[[3-[3,5-bis(1,1-dimethylethyl)-4-hydroxyphenyl]-1-oxopropoxy]methyl]-1,3-propanediyl] ester; 3,5-bis(1,1-dimethylethyl)-4-hydroxybenzenepropanoic acid, octadecyl ester; 2,2'-methylenebis[6-(1,1-dimethylethyl)-4-methylphenol; 2-(1,1-dimethylethyl)-phenol; 2,4,6-tris(1,1-dimethylethyl)-phenol; 4,4'-methylenebis[2,6-bis(1,1-dimethylethyl)-phenol; 4,4',4"-[(2,4,6-trimethyl-1,3,5-benzenetriyl)tris(methylene)]tris[2,6-bis(1,1-dimethylethyl)-pshenol]; N,N'-1,6-hexanediylbis[3,5-bis(1,1-dimethylethyl)-4-hydroxybenzenepropanamide; 3,5-bis(1,1-dimethylethyl)-4-hydroxybenzoic acid, hexadecyl ester; P-[[3,5-bis(1,1-dimethylethyl)-4-hydroxyphenyl]methylphosphonic acid, diethyl ester; 1,3,5-tris[[3,5-bis(1,1-dimethylethyl)-4-hydroxyphenyl]methyl]-1,3,5-Triazine-2,4,6(1H,3H,5H)-trione; 3,5-bis(1,1-dimethylethyl)-4-hydroxybenzenepropanoic acid, 2-[3-[3,5-bis(1,1-dimethylethyl)-4-hydroxyphenyl]-1-oxopropyl]hydrazide; 3-(1,1-dimethylethyl)-4-hydroxy-5-methylbenzenepropanoic acid, 1,1'-[1,2-ethanediylbis(oxy-2,1-ethanediyl)] ester; 4-[(dimethylamino)methyl]-2,6-bis(1,1-dimethylethyl)phenol; 4-[[4,6-bis(octylthio)-1,3,5-triazin-2-yl]amino]-2,6-bis(1,1-dimethylethyl)phenol; 3,5-bis(1,1-dimethylethyl)-4-hydroxybenzenepropanoic acid, 1,1'-(thiodi-2,1-ethanediyl) ester; 3,5-bis(1,1-dimethylethyl)-4-hydroxybenzoic acid, 2,4-bis(1,1-dimethylethyl)phenyl ester; 3,5-bis(1,1-dimethylethyl)-4-hydroxybenzenepropanoic acid, 1,1'-(1,6-hexanediyl)ester; 3-(1,1-dimethylethyl)-4-hydroxy-5-methylbenzenepropanoic acid, 1,1'-[2,4,8,10-tetraoxaspiro[5.5]undecane-3,9-diylbis(2,2-dimethyl-2,1-ethanediyl)] ester; 3-(1,1-dimethylethyl)-□-[3-(1,1-dimethylethyl)-4-hydroxyphenyl]-4-hydroxy-□-methylbenzenepropanoic acid, 1,1'-(1,2-ethanediyl) ester; 2-[[3,5-bis(1,1-dimethylethyl)-4-hydroxyphenyl]methyl]-2-butylpropanedioic acid, 1,3-bis(1,2,2,6,6-pentamethyl-4-piperidinyl) ester; 3,5-bis(1,1-dimethylethyl)-4-hydroxybenzenepropanoic acid, 1-[2-[3-[3,5-bis(1,1-dimethylethyl)-4-hydroxyphenyl]-1-oxopropoxy]ethyl]-2,2,6,6-tetramethyl-4-piperidinyl ester; 3,4-dihydro-2,5,7,8-tetramethyl-2-[(4R,8R)-4,8,12-trimethyltridecyl]-(2R)-2H-1-benzopyran-6-ol; and mixtures thereof.

7. The composition of claim 5, wherein the substituted diarylamine is selected from one or more compounds selected from the group consisting of:

(a)

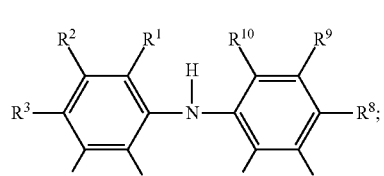

(XI)

(b)

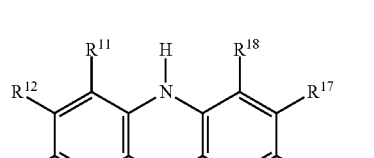

(XII)

-continued (c)
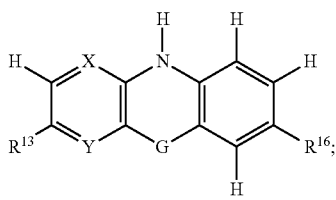

(d)
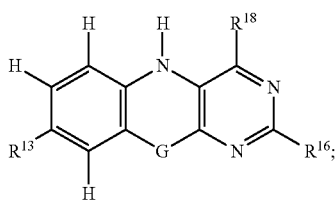

(e)
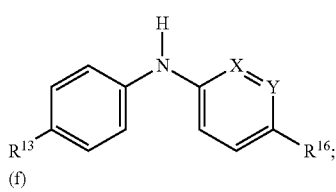

(f)
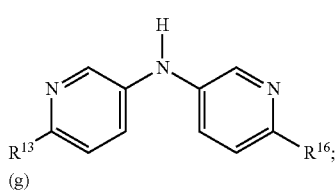

(g)
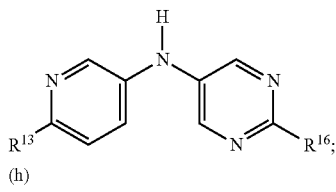

(h)
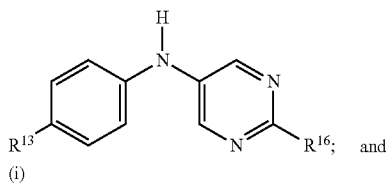

(i)
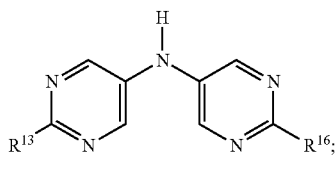

wherein either X is N and Y is C—H, or X is C—H and Y is N; wherein G, when present, is selected from the group consisting of O, S, Se, —CH=CH—, and —(CH$_2$)$_n$— wherein n=0, 1 or 2; and wherein at least one aryl ring is substituted with a non-H moiety;

wherein in the structure of formula (XI), $R^1$, $R^4$, $R^5$, $R^6$, $R^9$, and $R^{10}$ are independently selected from H and $C_1$-$C_{12}$ alkyl; $R^2$ and $R^7$ are independently H or may join together with $R^3$ or $R^8$, respectively, to form a fused aromatic ring; $R^3$ and $R^8$, when not so joined with $R^2$ or $R^7$, respectively, are independently selected from the group consisting of H, $C_1$-$C_{12}$ alkyl, —CF$_3$, —NO$_2$, —CN, —Cl, —Br, —F, $C_6$-$C_{12}$ aryl, $C_7$-$C_{12}$ alkaryl, —OR, —SO$_2$N(R)$_2$, and —N(R)$_2$, wherein each R is independently selected from H, $C_1$-$C_{12}$ alkyl, substituted $C_1$-$C_{12}$ alkyl, $C_6$-$C_{10}$ aryl, substituted $C_6$-$C_{10}$ aryl, $C_7$-$C_{12}$ alkaryl, substituted $C_7$-$C_{12}$ alkaryl, alkyleneoxy, and polyalkyleneoxy moieties;

wherein in the structure of formulas (XII)-(XIX), $R^{11}$, $R^{12}$, $R^{14}$, $R^{15}$, $R^{17}$, and $R^{18}$ are independently selected from H and $C_1$-$C_{12}$ alkyl; $R^{13}$ and $R^{16}$ are independently selected from the group consisting of H, $C_1$-$C_{12}$ alkyl, —CF$_3$, —NO$_2$, —CN, —Cl, —Br, —F, $C_6$-$C_{12}$ aryl, $C_7$-$C_{12}$ alkaryl, —OR, —SO$_2$N(R)$_2$, and —N(R)$_2$, wherein each R is independently selected from H, $C_1$-$C_{12}$ alkyl, substituted $C_1$-$C_{12}$ alkyl, $C_6$-$C_{10}$ aryl, substituted $C_6$-$C_{10}$ aryl, $C_7$-$C_{12}$ alkaryl, substituted $C_7$-$C_{12}$ alkaryl, alkyleneoxy, and polyalkyleneoxy moieties.

8. The composition of claim 7, wherein the substituted diarylamine is a compound selected from formula (XI), formula (XII), and mixtures thereof.

9. The composition of claim 6 wherein the substituted diarylamine is selected from the group consisting of 4-butyl-N-(4-methylphenyl)benzenamine; 2,4,6-trimethyl-N-(2,4,6-trimethylphenyl)benzenamine; 4-(trifluoromethyl)-N-[4-(trifluoromethyl)phenyl]-benzenamine; 4-(1,1-dimethylethyl)-N-[4-(1,1-dimethylethyl)phenyl] benzenamine; $N^1,N^1$-dimethyl-N4-phenyl-1,4-benzenediamine; $N^4$-[4-(dimethylamino)phenyl]-$N^1,N^1$-dimethyl-1,4-benzenediamine; 4-nitro-N-(4-nitrophenyl) benzenamine; 4-methoxy-N-phenylbenzenamine; 4-methyl-N-(4-methylphenyl)benzenamine; N-phenyl-2-naphthalenamine; 4-methoxy-N-(4-methoxyphenyl) benzenamine; 4-octyl-N-(4-octylphenyl)benzenamine; N-[1,1'-biphenyl]-4-yl-[1,1'-biphenyl]-4-amine; 4-heptyl-N-(4-heptylphenyl)-benzenamine; 4-(1-phenylethyl)-N-[4-(1-phenylethyl)phenyl]-benzenamine; 4,4'-iminobisbenzonitrile; 4-nonyl-N-(4-nonylphenyl)benzenamine; N-(2,4-dimethylphenyl)-2,4-dimethylbenzenamine; 4-(1,1,3,3-tetramethylbutyl)-N-[4-(1,1,3,3-tetramethylbutyl)phenyl] benzenamine; 4-(1-methyl-1-phenylethyl)-N-[4-(1-methyl-1-phenylethyl)phenyl]benzenamine; 1,9-bis(1,1-dimethylethyl)-10H-phenothiazine; 1,9-dimethyl-10H-phenothiazine; 3,7-dichloro-10H-phenothiazine; 3,7-dimethoxy-10H-phenothiazine; 10,11-dihydro-5H-dibenz[b,f]azepine; 10H-phenoselenazine; 5H-dibenz[b,f]azepine; 10H-phenoxazine; 10H-phenothiazine; 9,10-dihydroacridine; 9H-Carbazole; 2-(trifluoromethyl)-10H-phenoxazine; 2-(1,1-dimethylethyl)-10H-phenoxazine; 3-(trifluoromethyl)-10H-phenoxazine; 3,7-bis(trifluoromethyl)-10H-phenoxazine; 3-(1,1-dimethylethyl)-10H-phenoxazine; 3-(N,N-diethylsulfonyl)-10H-phenoxazine; 10H-phenoxazine-3-carbonitrile; 3-nitro-10H-phenoxazine; 3-methoxy-10H-phenoxazine; 2,4,6,8-tetrakis(1,1-dimethylethyl)-10H-phenoxazine; 2,8-bis(1,1-dimethylethyl)-10H-phenoxazine; 3-methoxy-7-nitro-10H-phenoxazine; 7-nitro-10H-phenoxazine-3-carbonitrile; 3,7-dimethoxy-10H-phenoxazine; 3,7-bis(1,1-dimethylethyl)-10H-phenoxazine; 7-fluoro-10H-phenoxazine-3-carbonitrile; 7-(diethylamino)-10H-phenoxazine-3-carbonitrile; 10H-phenoxazine-2,3-dicarbonitrile; 3,7-dinitro-10H-phenoxazine; 2-methyl-3-nitro- 10H-phenoxazine; 2-ethyl-3-nitro-1 OH-phenoxazine; N,N-diethyl-7-nitro-10H-phenoxazin-3-amine; 2,3-dinitro-10H-phenoxazine; 7-chloro-2-ethyl-3-nitro-10H-phenoxazine; N,N-diethyl-7-methoxy-10H-phenoxazin-3-amine; and mixtures thereof.

10. The composition of claim 7, wherein R is an alkyleneoxy or polyalkyleneoxy group selected from EO, PO, BO, and mixtures thereof.

11. The composition of claim 4, wherein the leuco composition comprises a compound selected from the group consisting of a diarylmethane leuco, a triarylmethane leuco, an oxazine leuco, a thiazine leuco, a hydroquinone leuco, an arylaminophenol leuco and mixtures thereof.

12. The composition of claim 11, wherein the leuco compound is selected from one or more compounds selected from the group consisting of:

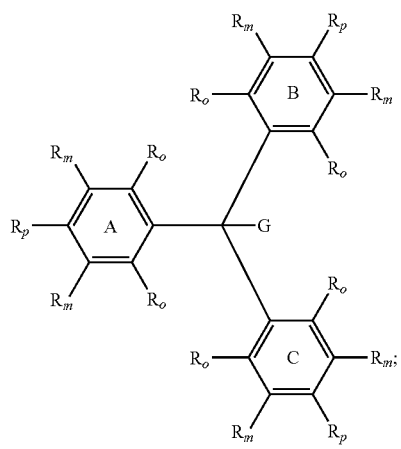
(I)

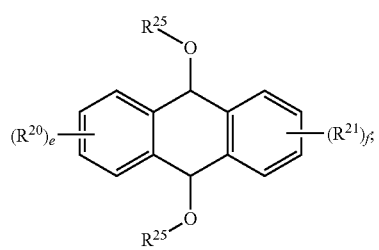
(II)

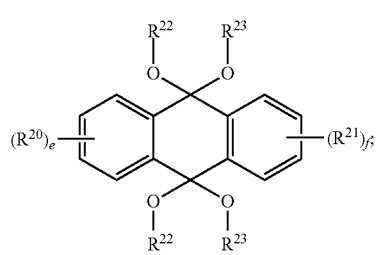
(III)

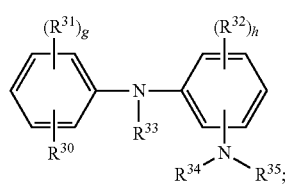
(IV)

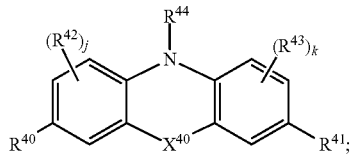
(V)

(f) mixtures thereof;

wherein the ratio of Formula I-V to its oxidized form is at least 1:3; wherein each individual $R_o$ and $R_m$ group on each of rings A, B and C is independently selected from the group consisting of hydrogen, deuterium and $R^5$; wherein each $R^5$ is independently selected from the group consisting of halogens, nitro, alkyl, substituted alkyl, aryl, substituted aryl, alkaryl, substituted alkaryl, —$(CH_2)_n$—O—$R^1$, —$C(O)R^1$, —$C(O)OR^1$, —$C(O)O^-$, —$C(O)NR^1R_2$, —$OC(O)R^1$, —$OC(O)OR^1$, —$OC(O)NR^1R_2$, —$S(O)_2R^1$, —$S(O)_2OR^1$, —$S(O)_2O^-$, —$S(O)_2NR^1R_2$, —$NR^1C(O)R^2$, —$NR^1C(O)OR^2$, —$NR^1C(O)SR^2$, —$NR^1C(O)NR^2R_3$, —$NR^1R_2$, —$P(O)_2R^1$, —$P(O)(OR^1)_2$, —$P(O)(OR^1)O^-$, and —$P(O)(O^-)_2$; wherein the index n is an integer from 0 to 4; wherein at least one of the $R_o$ and $R_m$ groups on at least one of the three rings A, B or C is hydrogen; wherein each $R_p$ is independently selected from hydrogen, —$OR^1$ and —$NR^1R^2$;

wherein G is independently selected from the group consisting of hydrogen, deuterium, $C_1$-$C_{16}$ alkoxide, phenoxide, bisphenoxide, nitrite, nitrile, alkyl amine, imidazole, arylamine, polyalkylene oxide, halides, alkylsulfide, aryl sulfide, and phosphine oxide;

wherein $R^1$, $R^2$ and $R^3$ are independently selected from the group consisting of hydrogen, alkyl, substituted alkyl, aryl, substituted aryl, alkaryl, substituted alkaryl, and $R^4$; $R^4$ is an organic group composed of one or more organic monomers with said monomer molecular weights ranging from 28 to 500;

wherein e and f are independently integers from 0 to 4;

wherein each $R^{20}$ and $R^{21}$ is independently selected from the group consisting of a halogen, a nitro group, alkyl groups, substituted alkyl groups, —$NC(O)OR^1$, —$NC(O)SR^1$, —$OR^1$, and —$NR^1R^2$;

wherein each $R^{25}$ is independently selected from the group consisting of a monosaccharide moiety, a disaccharide moiety, an oligosaccharide moiety, a polysaccharide moiety, —$C(O)R^1$, —$C(O)OR^1$, —$C(O)NR^1R^2$;

wherein each $R^{22}$ and $R^{23}$ is independently selected from the group consisting of hydrogen, an alkyl group, and substituted alkyl groups;

wherein $R^{30}$ is positioned ortho or para to the bridging amine moiety and is selected from the group consisting of —$OR^{38}$ and —$NR^{36}R^{37}$, wherein each $R^{36}$ and $R^{37}$ is independently selected from the group consisting of hydrogen, an alkyl group, a substituted alkyl group, an aryl group, a substituted aryl group, an acyl group, $R^4$, —$C(O)OR^1$, —$C(O)R^1$, and —$C(O)NR^1R^2$;

wherein $R^{38}$ is selected from the group consisting of hydrogen, an acyl group, —$C(O)OR^1$, —$C(O)R^1$, and —$C(O)NR^1R^2$;

wherein g and h are independently integers from 0 to 4;

wherein each $R^{31}$ and $R^{32}$ is independently selected from the group consisting of an alkyl group, a substituted alkyl group, an aryl group, a substituted aryl group, an alkaryl, substituted alkaryl, —C(O)R$^1$, —C(O)OR$^1$, —C(O)O$^-$, —C(O)NR$^1$R$^2$, —OC(O)R$^1$, —OC(O)OR$^1$, —OC(O)NR$^1$R$^2$, —S(O)$_2$R$^1$, —S(O)$_2$OR$^1$, —S(O)$_2$O$^-$, —S(O)$_2$NR$^1$R$^2$, —NR$^1$C(O)R$^2$, —NR$^1$C(O)OR$^2$, —NR$^1$C(O)SR$^2$, —NR$^1$C(O)NR$^2$R$^3$, —OR$^1$, —NR$^1$R$^2$, —P(O)$_2$R$^1$, —P(O)(OR$^1$)$_2$, —P(O)(OR$^1$)O$^-$, and —P(O)(O$^-$)$_2$;

wherein —NR$^{34}$R$^{35}$ is positioned ortho or para to the bridging amine moiety and R$^{34}$ and R$^{35}$ are independently selected from the group consisting of hydrogen, an alkyl, a substituted alkyl, an aryl, a substituted aryl, an alkaryl, a substituted alkaryl, and R$^4$;

wherein R$^{33}$ is independently selected from the group consisting of hydrogen, —S(O)$_2$R$^1$, —C(O)N(H)R$^1$; —C(O)OR$^1$; and —C(O)R$^1$; wherein when g is 2 to 4, any two adjacent R$^{31}$ groups may combine to form a fused ring of five or more members wherein no more than two of the atoms in the fused ring may be nitrogen atoms;

wherein X$^{40}$ is selected from the group consisting of an oxygen atom, a sulfur atom, and NR$^{45}$; wherein R$^{45}$ is independently selected from the group consisting of hydrogen, deuterium, an alkyl, a substituted alkyl, an aryl, a substituted aryl, an alkaryl, a substituted alkaryl, —S(O)$_2$OH, —S(O)$_2$O$^-$, —C(O)OR$^1$, —C(O)R$^1$, and —C(O)NR$^1$R$^2$;

wherein R$^{40}$ and R$^{41}$ are independently selected from the group consisting of —(CH$_2$)$_n$—O—R$^1$, —(CH$_2$)$_n$—NR$^1$R$^2$, wherein the index n is an integer from 0 to 4, preferably from 0 to 1, most preferably 0;

wherein j and k are independently integers from 0 to 3;

wherein R$^{42}$ and R$^{43}$ are independently selected from the group consisting of an alkyl, a substituted alkyl, an aryl, a substituted aryl, an alkaryl, a substituted alkaryl, —S(O)$_2$R$^1$, —C(O)NR$^1$R$^2$, —NC(O)OR$^1$, —NC(O)SR$^1$, —C(O)OR$^1$, —C(O)R$^1$, —OR$^1$, —NR$^1$R$^2$;

wherein R$^{44}$ is —C(O)R$^1$, —C(O)NR$^1$R$^2$, and —C(O)OR$^1$;

wherein any charge present in any of the compounds is balanced with a suitable independently selected internal or external counterion.

13. The composition of claim 12, wherein the leuco compound is a compound of formula I.

14. The composition of claim 13, wherein two R$_o$ groups on different A, B and C rings combine to form a fused ring of five or more members.

15. The composition of claim 14, wherein the fused ring is six or more members and two R$_o$ groups on different A, B and C rings combine to form an organic linker containing one or more heteroatoms.

16. The composition of claim 15, wherein two R$_o$ on different A, B and C rings combine to form a heteroatom bridge selected from —O— and —S— to create a six member fused ring.

17. The composition of claim 13, wherein all four of the R$_o$ and R$_m$ groups on at least one of the three rings A, B or C are hydrogen.

18. The composition of claim 17, wherein all of the R$_o$ and R$_m$ groups on all three rings A, B or C are hydrogen.

19. The composition of claim 18, wherein each R$_p$ is an independently selected —NR$^1$R$^2$ group.

20. The composition of claim 12, wherein the organic group may be substituted with one or more additional leuco colorant moieties conforming to the structure of Formula I.

21. The composition of claim 12, wherein R$^4$ is selected from the group consisting of alkyleneoxy, oxoalkyleneoxy, oxoalkyleneamine, epichlorohydrin, quaternized epichlorohydrin, alkyleneamine, hydroxyalkylene, acyloxyalkylene, carboxyalkylene, carboalkoxyalkylene, and sugar.

22. The composition of claim 1, wherein the composition contains at least one solvent selected from the group consisting of water, ethanol, ethylene glycol, propylene glycol, propylene carbonate, ethylene carbonate, polyalkyleneoxide, polyester, polycarbonate, polyaziridine, polyethylene glycol, polypropylene glycol, nonionic surfactant, and mixtures thereof.

23. The composition of claim 19, wherein the composition contains at least one solvent from the group consisting of water, ethylene glycol, propylene glycol, polyethylene glycol, polypropylene glycol, copolymer of ethylene glycol and propylene glycol, nonionic surfactant, and mixture thereof.

24. The composition of claim 1, wherein the composition contains at least one nonionic surfactant.

* * * * *